(12) United States Patent
Inoue et al.

(10) Patent No.: US 11,862,993 B1
(45) Date of Patent: Jan. 2, 2024

(54) HIGH-POWER REFLEXIVE FIELD CONTAINMENT CIRCUIT TOPOLOGY FOR DYNAMIC WIRELESS POWER TRANSFER SYSTEMS

(71) Applicants: Shuntaro Inoue, North Logan, UT (US); Chakridhar Reddy Teeneti, North Logan, UT (US); Abhilash Kamineni, North Logan, UT (US); Regan A. Zane, Hyde Park, UT (US)

(72) Inventors: Shuntaro Inoue, North Logan, UT (US); Chakridhar Reddy Teeneti, North Logan, UT (US); Abhilash Kamineni, North Logan, UT (US); Regan A. Zane, Hyde Park, UT (US)

(73) Assignee: Utah State University, Logan, UT (US)

( * ) Notice: Subject to any disclaimer, the term of this patent is extended or adjusted under 35 U.S.C. 154(b) by 0 days.

(21) Appl. No.: 17/856,546

(22) Filed: Jul. 1, 2022

(51) Int. Cl.
| | | |
|---|---|---|
| *H02J 50/80* | (2016.01) | |
| *H02J 50/70* | (2016.01) | |
| *H02J 50/40* | (2016.01) | |
| *B60L 53/12* | (2019.01) | |
| *H02M 7/537* | (2006.01) | |
| *H02M 7/06* | (2006.01) | |
| *H02J 50/12* | (2016.01) | |

(52) U.S. Cl.
CPC ............ *H02J 50/70* (2016.02); *B60L 53/12* (2019.02); *H02J 50/12* (2016.02); *H02J 50/402* (2020.01); *H02M 7/06* (2013.01); *H02M 7/537* (2013.01)

(58) Field of Classification Search
None
See application file for complete search history.

(56) References Cited

U.S. PATENT DOCUMENTS

| | | | |
|---|---|---|---|
| 9,561,730 B2 * | 2/2017 | Widmer | B60L 50/66 |
| 11,218,026 B1 * | 1/2022 | Hansen | H02M 3/01 |
| 2017/0222484 A1 * | 8/2017 | DeBaun | B60L 53/38 |
| 2021/0083517 A1 * | 3/2021 | Channoullis | H02M 1/4208 |

* cited by examiner

*Primary Examiner* — Jared Fureman
*Assistant Examiner* — Esayas G Yeshaw
(74) *Attorney, Agent, or Firm* — Kunzler Bean & Adamson; Bruce R. Needham

(57) ABSTRACT

An apparatus for a high-power reflexive field containment circuit topology for dynamic wireless power transfer systems is disclosed. A wireless power transfer ("WPT") charging apparatus includes an inverter configured to connect with a direct current ("DC") source on an input side and one or more WPT charging branches. Each WPT charging branch includes a WPT charging pad circuit with a WPT charging pad connected in series with a first series charging capacitor, a parallel charging capacitor connected in parallel with the WPT charging pad circuit, and a series charging impedance connected in series between an output of the inverter and a connection between the WPT charging pad circuit and the parallel charging capacitor. The series charging impedance includes a second series charging capacitor and/or a series charging inductor.

18 Claims, 13 Drawing Sheets

(a)

(b)

(a)

(b)

(a)

(b)

(a)

(b)

(a)

(b)

HIGH-POWER REFLEXIVE FIELD CONTAINMENT CIRCUIT TOPOLOGY FOR DYNAMIC WIRELESS POWER TRANSFER SYSTEMS

GOVERNMENT LICENSE RIGHTS

This invention was made with government support under contract #1941524 awarded by the National Science Foundation. The government has certain rights in the invention.

FIELD

This invention relates to electric vehicle charging and more particularly relates to a high-power reflexive field containment circuit topology for dynamic wireless power transfer systems.

BACKGROUND

Electric vehicles ("EVs") have been drawing high attention due to their zero tailpipe emissions and lower running costs. However, EVs suffer from limited driving range, longer charging time, and higher upfront costs. Dynamic wireless charging can alleviate all these problems by enabling EVs to travel farther on a smaller battery pack. Thereby, it has the potential to make EVs more affordable and increase their adoption in the market.

Dynamic wireless power transfer ("DWPT") systems are categorized into three types: inductive type, capacitive type, and microwave type. The inductive power transfer ("IPT") type uses induced power with magnetically coupled coils. The inductive type can typically deliver a high output power of several tens of kilowatts within a gap shorter than the diameter of the transmitter coil itself. The capacitive type uses coupled electrodes for power transfer. The capacitive type requires high-frequency MHz range switching and has very high voltages and electric fields across the capacitive electrodes. The microwave power transfer type uses waves that have wavelengths approximately in the range of 300 millimeter ("mm") (e.g., 1 giga hertz ("GHz")) to 1 mm (e.g., 300 GHz). Although the microwave power transfer is capable of long-distance power transmission, the serious damage microwaves cause to human bodies is the biggest problem of the microwave type. IPT type is one of the most attractive solutions for DWPT systems in transportation applications as it can offer high power output of up to several tens of kilowatts over an air-gap range of 150 mm to 350 mm.

Dynamic Inductive Power Transfer ("DIPT") systems can be categorized by coil configurations; elongated-rail-transmitter-coil type and segmented-transmitter-coil type. The elongated-rail-transmitter-coil type has sufficiently larger transmitter coils than the receiver coils. The segmented-transmitter-coil type has multiple lumped transmitter coils.

The benefits of the elongated-rail-transmitter-coil type are the simplicity of the system control and the need for fewer inverters. However, the elongated-rail-transmitter-coil type has two drawbacks. Firstly, the coil generates a stray magnetic field in large area since a long stretch of road has coil that are excited with high current even if a receiver coil is only on a small portion of the transmitter. This results in difficulty of maintaining stray field below the safety limits and achieving high system efficiency.

Secondly, the elongated-rail-transmitter-coil design has a higher self-inductance due to the longer coil length, which creates high voltages across the coil terminals. It is difficult to limit the coil voltage below the insulation capability of high-frequency power cables, which is typically up to 5 kV.

The segmented-transmitter-coil type can be categorized into individual inverter type, bypass switch type, and reflexive field containment type. The segmented-transmitter-coil type solves the issues of higher stray magnetic field, lower coupling coefficient, and large self-inductance at the transmitter side. However, the segmented coil design results in a complicated system requiring more inverters to power the coil, additional bypass switches, and receiver position sensors.

The individual inverter type needs an inverter and a receiver position sensor for each coil. The system turns out to be quite expensive compared to the elongated-rail-transmitter-coil type.

The bypass switch type uses mechanical relays or bidirectional semiconductor switches to switch circuits to use the same inverter for driving multiple transmitter coils. The system switches the coils connected to an inverter according to the position of the secondary coil. The benefit of the system is that it can reduce the number of inverters. However, the sensors for each segmented coil are still needed to detect the secondary side coil and to switch the bypass switches. Additionally, a high-level soft-switching technique is needed in the bypass switches to execute smooth switching while delivering a high amount of power.

SUMMARY

An apparatus for a high-power reflexive field containment circuit topology for dynamic wireless power transfer systems is disclosed. A wireless power transfer ("WPT") charging apparatus includes an inverter configured to connect with a direct current ("DC") source on an input side and one or more WPT charging branches. Each WPT charging branch includes a WPT charging pad circuit with a WPT charging pad connected in series with a first series charging capacitor, a parallel charging capacitor connected in parallel with the WPT charging pad circuit, and a series charging impedance connected in series between an output of the inverter and a connection between the WPT charging pad circuit and the parallel charging capacitor. The series charging impedance includes a second series charging capacitor and/or a series charging inductor.

A system for a high-power reflexive field containment circuit topology for dynamic wireless power transfer systems includes a WPT charging apparatus that includes an inverter configured to connect with a DC source on an input side, and a plurality of WPT charging branches. Each WPT charging branch includes a WPT charging pad circuit with a WPT charging pad connected in series with a first series charging capacitor, a parallel charging capacitor connected in parallel with the WPT charging pad circuit, and a series charging impedance connected in series between an output of the inverter and a connection between the WPT charging pad circuit and the parallel charging capacitor. The series charging impedance includes a second series charging capacitor and/or a series charging inductor. The system includes a WPT receiver apparatus with a rectification section that includes an output configured to connect to a load and a WPT receiver branch. The WPT receiver branch includes a WPT receiver pad connected in series with a first series receiver capacitor, a parallel receiver capacitor connected in parallel with a branch comprising the WPT receiver and first series receiver capacitor, and a second series receiver capacitor connected in series between a connection to the WPT receiver branch and an input of the rectification section. The WPT receiver pad is mobile with respect to each of the one or more the WPT charging pads.

Another system for a high-power reflexive field containment circuit topology for dynamic wireless power transfer systems includes a WPT charging apparatus. The WPT charging apparatus includes an inverter configured to connect with a DC source on an input side and a plurality of WPT charging branches. Each WPT charging branch includes a WPT charging pad circuit with a WPT charging pad connected in series with a first series charging capacitor, a parallel charging capacitor connected in parallel with the WPT charging pad circuit, and a series charging impedance connected in series between an output of the inverter and a connection between the WPT charging pad circuit and the parallel charging capacitor. The series charging impedance includes a second series charging capacitor and a series charging inductor and a WPT receiver apparatus. The WPT receiver apparatus includes a rectification section with an output configured to connect to a load and a WPT receiver branch. The WPT receiver branch includes a WPT receiver pad connected in series with a first series receiver capacitor, a parallel receiver capacitor connected in parallel with a branch with the WPT receiver and first series receiver capacitor, and a second series receiver capacitor connected in series between a connection to the WPT receiver branch and an input of the rectification section.

In the system, the WPT receiver pad is mobile with respect to each of the one or more the WPT charging pads, and $$n_1 = \frac{C_{1,p}}{C_{1,sa}} + 1(n_1 > 0)$$

$$C'_{1,sa} = \frac{C_{1,sa}}{1 + \omega^2 L_{1,sa} C_{1,sa}}$$

$$n_2 = \frac{C_{r,p}}{C_{r,sb}} + 1(n_2 > 1),$$

$$n_3 = \frac{C_{r,p}}{C_{r,sa}} + 1(n_3 > 1)$$

where $C_{1,sa}$ is second series charging capacitor, $\omega$ is an angular switching frequency of the inverter, $C_{1,p}$ is the parallel receiver capacitor, $L_{1,sa}$ is the series charging inductance, $C_{r,p}$ is the parallel receiver capacitor, $C_{r,sb}$ is the first series receiver capacitor, $C_{r,sa}$ is the second series receiver capacitor, $n_1$ is a buck-boost factor of an equivalent input voltage at the output of the inverter, $n_2$ is a ratio relating the parallel receiver capacitor to the first series receiver capacitor, and $n_3$ is a ratio relating the parallel receiver capacitor to the second series receiver capacitor.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
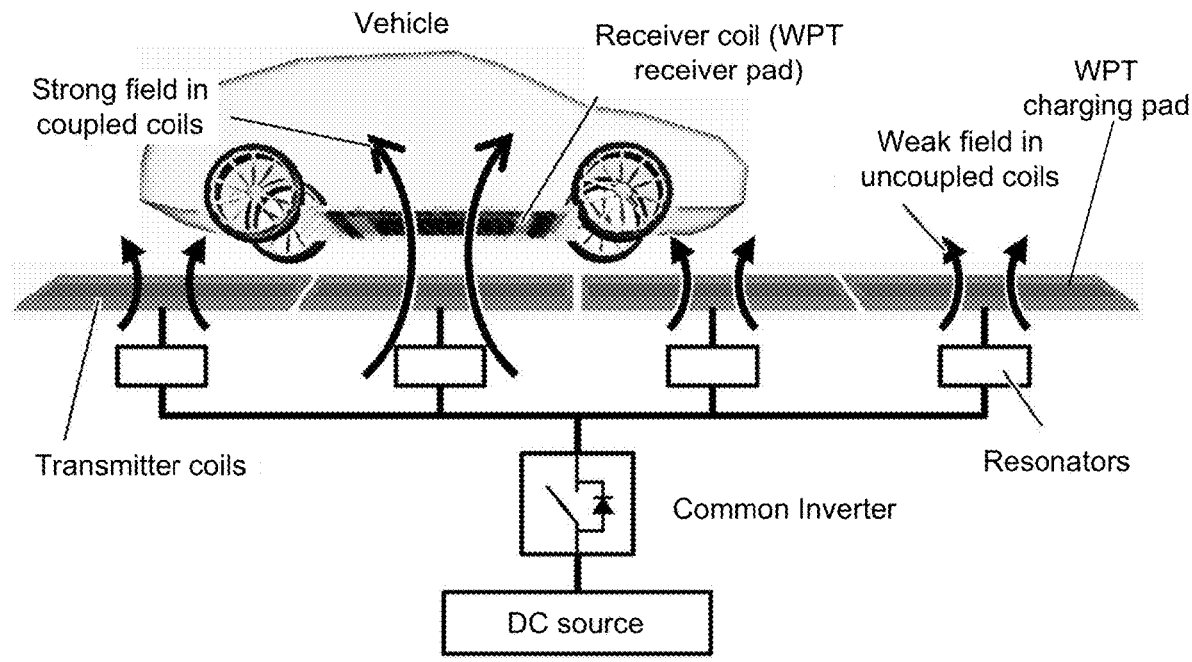
FIG. 1 is a conceptual schematic block diagram illustrating a reflexive containment approach, according to various embodiments.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

An apparatus for a high-power reflexive field containment circuit topology for dynamic wireless power transfer systems is disclosed. A wireless power transfer ("WPT") charging apparatus includes an inverter configured to connect with a direct current ("DC") source on an input side and one or more WPT charging branches. Each WPT charging branch includes a WPT charging pad circuit with a WPT charging pad connected in series with a first series charging capacitor, a parallel charging capacitor connected in parallel with the WPT charging pad circuit, and a series charging impedance connected in series between an output of the inverter and a connection between the WPT charging pad circuit and the parallel charging capacitor. The series charging impedance includes a second series charging capacitor and/or a series charging inductor.

In some embodiments, the WPT charging apparatus also includes a WPT receiver apparatus that includes a rectification section with an output configured to connect to a load and a WPT receiver branch. The WPT receiver branch includes a WPT receiver pad connected in series with a first series receiver capacitor, a parallel receiver capacitor connected in parallel with a branch that includes the WPT receiver and first series receiver capacitor, and a second series receiver capacitor connected in series between a connection to the WPT receiver branch and an input of the rectification section.

In some embodiments, the series charging impedance, the first series charging capacitor, the parallel charging capacitor, the first series receiver capacitor, the parallel receiver capacitor, and the second series receiver capacitor are related by a buck-boost factor $n_1$ relating the series charging impedance with the parallel charging capacitor, and by:

$$n_2 = \frac{C_{r,p}}{C_{r,sb}} + 1 (n_2 > 1)$$

$$n_3 = \frac{C_{r,p}}{C_{r,sa}} + 1 (n_3 > 1)$$

where $n_1$ is a buck-boost factor of an equivalent input voltage at the output of the inverter, $C_{r,p}$ is the parallel receiver capacitor, $C_{r,sb}$ is the first series receiver capacitor, $C_{r,sa}$ is the second series receiver capacitor, $n_2$ is a ratio relating the parallel receiver capacitor to the first series receiver capacitor, and $n_3$ is a ratio relating the parallel receiver capacitor to the second series receiver capacitor.

In other embodiments, the series charging impedance is the first series charging capacitor without the series charging inductor and where:

$$n_1 = \frac{C_{1,p}}{C_{1,sa}} + 1 (n_1 > 0)$$

where $C_{1,p}$ is the parallel charging capacitor, and $C_{1,sa}$ is the second series charging capacitor. In other embodiments, the series charging impedance comprises the first series charging capacitor and the series charging inductor and where:

$$n_1 = \frac{C_{1,p}}{C'_{1,sa}} + 1 (n_1 > 0)$$

where:

$$C'_{1,sa} = \frac{C_{1,sa}}{1 + \omega^2 L_{1,sa} C_{1,sa}}$$

and where $C_{1,sa}$ is second series charging capacitor, ω is an angular switching frequency of the inverter, $C_{1,p}$ is the parallel receiver capacitor, and $L_{1,sa}$ is the series charging inductance. In other embodiments, the series charging impedance is the series charging inductor without the first series charging capacitor, and where:

$$n_1 = -\omega^2 L_{1,sa} C_{1,p} + 1 (n_1 > 0)$$

where ω is an angular switching frequency of the inverter, $C_{1,p}$ is the parallel charging capacitor, and $L_{1,sa}$ is the series charging inductance.

In some embodiments, the buck-boost factor $n_1$ is less than 0.9 or greater than 1.1. In other embodiments, $n_3$ is greater than 1.1. In other embodiments, each of the one or more WPT charging branches includes an inductance of the WPT charging pad, capacitance of the first series charging capacitor, capacitance of the parallel charging capacitor selected to operate at resonance at a switching frequency of the inverter in response to the WPT receiver pad being uncoupled with the WPT charging pad. In other embodiments, the one or more WPT charging branches include two or more WPT charging branches and the WPT receiver pad of the WPT receiver apparatus moves across the WPT charging pads of the WPT charging branches in a direction perpendicular to a plane comprising the WPT charging pads. In other embodiments, the rectifier circuit includes a low pass filter. In other embodiments, the rectifier circuit includes an active rectifier circuit comprising switches. In other embodiments, the WPT charging pad and the WPT receiver pad are configured to transmit and receive power wirelessly. In other embodiments, the inverter includes a bandpass filter connected between an output of a switching section of the inverter and the output of the inverter. The bandpass filter includes a bandpass inductor in series with a bandpass capacitor where the bandpass filter is designed to pass a switching frequency of the inverter.

A system for a high-power reflexive field containment circuit topology for dynamic wireless power transfer systems includes a WPT charging apparatus that includes an inverter configured to connect with a DC source on an input side, and a plurality of WPT charging branches. Each WPT charging branch includes a WPT charging pad circuit with a WPT charging pad connected in series with a first series charging capacitor, a parallel charging capacitor connected in parallel with the WPT charging pad circuit, and a series charging impedance connected in series between an output of the inverter and a connection between the WPT charging pad circuit and the parallel charging capacitor. The series charging impedance includes a second series charging capacitor and/or a series charging inductor. The system includes a WPT receiver apparatus with a rectification section that includes an output configured to connect to a load and a WPT receiver branch. The WPT receiver branch includes a WPT receiver pad connected in series with a first series receiver capacitor, a parallel receiver capacitor connected in parallel with a branch comprising the WPT receiver and first series receiver capacitor, and a second series receiver capacitor connected in series between a connection to the WPT receiver branch and an input of the rectification section. The WPT receiver pad is mobile with respect to each of the one or more the WPT charging pads.

In some embodiments, the series charging impedance, the first series charging capacitor, the parallel charging capacitor, the first series receiver capacitor, the parallel receiver capacitor, and the second series receiver capacitor are related by a buck-boost factor $n_1$ relating the series charging impedance with the parallel charging capacitor, and by:

$$n_2 = \frac{C_{r,p}}{C_{r,sb}} + 1 (n_2 > 1)$$

$$n_3 = \frac{C_{r,p}}{C_{r,sa}} + 1 (n_3 > 1)$$

where $n_1$ is a buck-boost factor of an equivalent input voltage at the output of the inverter, $C_{r,p}$ is the parallel receiver capacitor, $C_{r,sb}$ is the first series receiver capacitor, $C_{r,sa}$ is the second series receiver capacitor, $n_2$ is a ratio relating the parallel receiver capacitor to the first series receiver capacitor, and $n_3$ is a ratio relating the parallel receiver capacitor to the second series receiver capacitor.

In some embodiments, the series charging impedance is the first series charging capacitor without the series charging inductor and where:

$$n_1 = \frac{C_{1,p}}{C_{1,sa}} + 1 (n_1 > 0)$$

where $C_{1,p}$ is the parallel charging capacitor, and $C_{1,sa}$ is the second series charging capacitor. In other embodiments, the series charging impedance includes the first series charging capacitor and the series charging inductor and where:

$$n_1 = \frac{C_{1,p}}{C'_{1,sa}} + 1 (n_1 > 0)$$

where:

$$C'_{1,sa} = \frac{C_{1,sa}}{1 + \omega^2 L_{1,sa} C_{1,sa}}$$

and where $C_{1,sa}$ is second series charging capacitor, ω is an angular switching frequency of the inverter, $C_{1,p}$ is the parallel receiver capacitor, and $L_{1,sa}$ is the series charging inductance. In other embodiments, the series charging impedance is the series charging inductor without the first series charging capacitor and where:

$$n_1 = -\omega^2 L_{1,sa} C_{1,p} + 1 (n_1 > 0)$$

where ω is an angular switching frequency of the inverter, $C_{1,p}$ is the parallel charging capacitor, and $L_{1,sa}$ is the series charging inductance.

In some embodiments, the buck-boost factor $n_1$ is less than 0.9 or greater than 1.1, and/or wherein the $n_3$ is greater than 1.1. In other embodiments, the inverter includes a bandpass filter connected between an output of a switching section of the inverter and the output of the inverter. The bandpass filter includes a bandpass inductor in series with a bandpass capacitor where the bandpass filter is designed to pass a switching frequency of the inverter.

Another system for a high-power reflexive field containment circuit topology for dynamic wireless power transfer systems includes a WPT charging apparatus. The WPT charging apparatus includes an inverter configured to connect with a DC source on an input side and a plurality of WPT charging branches. Each WPT charging branch includes a WPT charging pad circuit with a WPT charging pad connected in series with a first series charging capacitor, a parallel charging capacitor connected in parallel with the WPT charging pad circuit, and a series charging impedance connected in series between an output of the inverter and a connection between the WPT charging pad circuit and the parallel charging capacitor. The series charging impedance includes a second series charging capacitor and a series charging inductor and a WPT receiver apparatus. The WPT receiver apparatus includes a rectification section with an output configured to connect to a load and a WPT receiver branch. The WPT receiver branch includes a WPT receiver pad connected in series with a first series receiver capacitor, a parallel receiver capacitor connected in parallel with a branch with the WPT receiver and first series receiver capacitor, and a second series receiver capacitor connected in series between a connection to the WPT receiver branch and an input of the rectification section.

In the system, the WPT receiver pad is mobile with respect to each of the one or more the WPT charging pads, and $$n_1 = \frac{C_{1,p}}{C'_{1,sa}} + 1 (n_1 > 0)$$

$$C'_{1,sa} = \frac{C_{1,sa}}{1 + \omega^2 L_{1,sa} C_{1,sa}}$$

$$n_2 = \frac{C_{r,p}}{C_{r,sb}} + 1 (n_2 > 1),$$

$$n_3 = \frac{C_{r,p}}{C_{r,sb}} + 1 (n_3 > 1)$$

where $C_{1,sa}$ is second series charging capacitor, $\omega$ is an angular switching frequency of the inverter, $C_{1,p}$ is the parallel receiver capacitor, $L_{1,sa}$ is the series charging inductance, $C_{r,p}$ is the parallel receiver capacitor, $C_{r,sb}$ is the first series receiver capacitor, $C_{r,sa}$ is the second series receiver capacitor, $n_1$ is a buck-boost factor of an equivalent input voltage at the output of the inverter, $n_2$ is a ratio relating the parallel receiver capacitor to the first series receiver capacitor, and $n_3$ is a ratio relating the parallel receiver capacitor to the second series receiver capacitor.

Reflexive field containment type switches resonated transmitter coils utilizing reflected impedance. FIG. 1 shows a concept of the reflexive field containment approach. The vehicle includes a WPT receiver apparatus with a WPT receiver coil mounted on the bottom of the vehicle. Typically, the WPT receiver apparatus is connected to a load of a battery, but the load could also include a motor, electronics, etc. This system has a common inverter and segmented transmitter coils. Each transmitter coil is connected to a resonator circuit which is detuned when a vehicle is not present. As a result, a low current will flow through the coils when no secondary circuit is present. However, when a vehicle is on top of the transmitter coil, the reflected impedance from the secondary side will tune the transmitter resonator circuit, allowing a large current to flow through the transmitter coils and therefore transfer power to the vehicle. As a result, the system can change the amplitude of the current in each transmitter coil automatically, even though all the transmitter coils are being excited by the same inverter. However, existing reflexive field containment circuits do not allow both the power output and gain of the transmitter coil to be designed simultaneously. Hence, it is difficult to achieve high output power while maintaining the desired gain of transmitter current. A new reflexive field containment circuit is discussed herein with more degrees of freedom is proposed for high-power dynamic wireless power transfer systems, such as automotive applications.

I. PROPOSED REFLEXIVE FIELD CONTAINMENT TOPOLOGY

Figure 2:
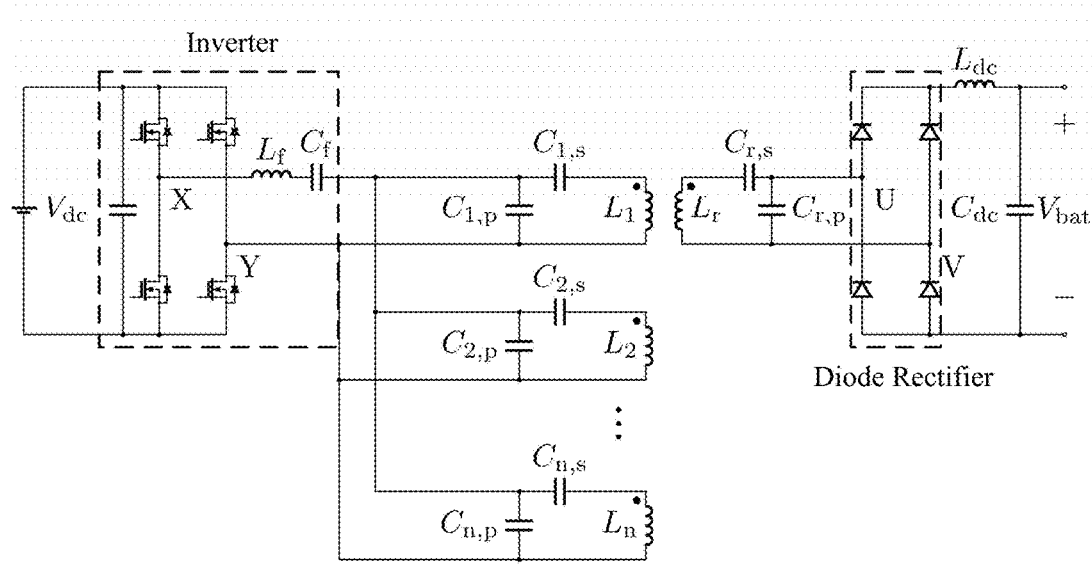
FIG. 2 is a circuit diagram illustrating a conventional reflexive field containment circuit topology.

The conventional reflexive field containment circuit topology is shown in FIG. 2. The conventional circuit includes a bandpass filter formed by bandpass inductor $L_f$ and bandpass capacitor $C_f$ on the inverter side. The purpose of the bandpass filter is to reduce switching loss due to harmonics in the inverter current from the uncoupled transmitter coil branches. Each branch has a parallel compensation capacitor $C_{1,p}$ (also referred to herein as a "parallel charging capacitor") and a series compensation capacitor $C_{1,s}$ (also referred to herein as a first series charging capacitor and with $C_{2,p}$ and $C_{2,s}$ in the second branch, . . . $C_{n,p}$ and $C_{n,s}$ in the $n^{th}$ branch). On the receiver side, a series compensation capacitor $C_{r,s}$ (also referred to herein as a "parallel receiver capacitor") and a parallel compensation capacitor $C_{r,p}$ are attached (also referred to herein as a "first series receiver capacitor").

The conventional circuit includes an output inductor $L_{dc}$ between the secondary compensation circuit and the output voltage $V_{bat}$, since the parallel compensation capacitor $C_{r,p}$ on the receiver can be assumed as a voltage source and switching action of the diode rectifier typically creates large current spikes if the output inductor $L_{dc}$ is not attached between the parallel compensation capacitor $C_{r,p}$ and the output voltage $V_{bat}$ of the receiver.

Figure 3A:
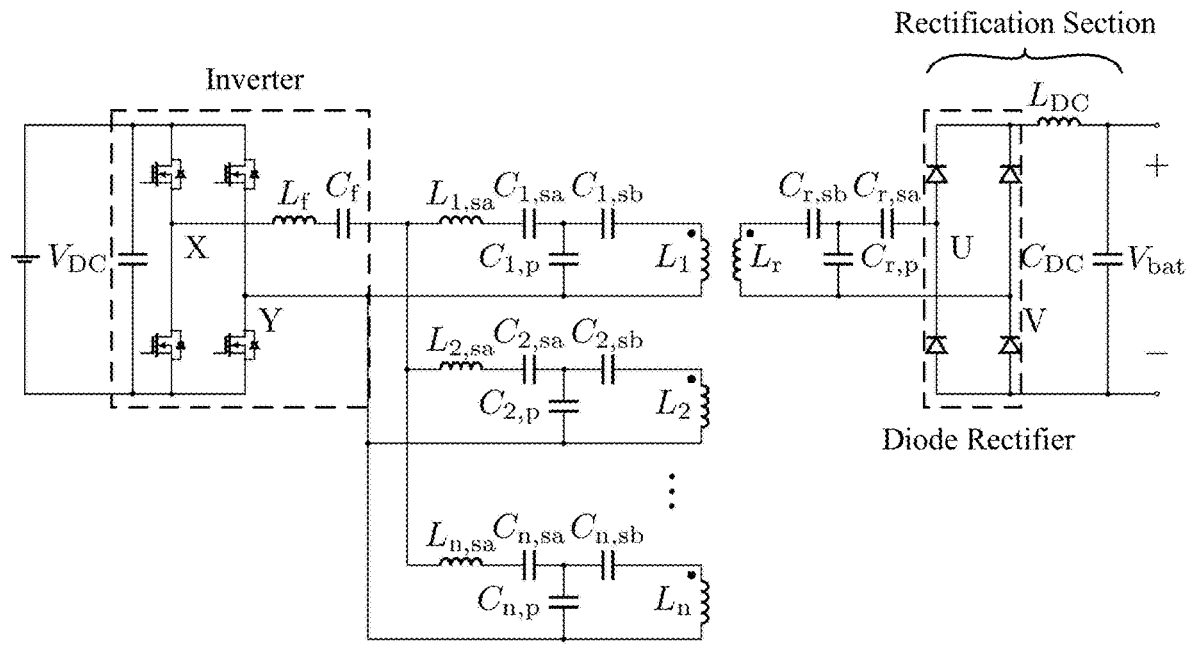
FIG. 3A is a circuit diagram illustrating a proposed reflexive field containment circuit topology with a series charging impedance with an inductor and a capacitor, according to various embodiments.

FIG. 3A is a circuit diagram illustrating a proposed reflexive field containment circuit topology with a series charging impedance with an inductor and a capacitor, according to various embodiments. The system of FIG. 3A includes a WPT charging apparatus on the left, which includes a DC source $V_{DC}$ connected to an inverter, a bandpass filter that includes a bandpass inductor $L_f$ and a bandpass capacitor $C_f$, and one or more WPT charging branches. In some embodiments, the WPT charging apparatus includes a rectifier and is connected to an alternating current ("AC") source where the AC source is rectified to provide a DC voltage to the inverter. In the embodiment, the rectifier may be a full-bridge rectifier or a half-bridge rectifier and may be followed by a lowpass filter.

In some embodiments, the WPT charging apparatus does not include the bandpass filter. Each WPT charging branch includes a WPT charging pad represented by $L_1, L_2, \ldots L_n$, a first series charging capacitor $C_{1,sb}, C_{2,sb}, \ldots C_{n,sb}$, a parallel charging capacitor $C_{1,p}, C_{2,p}, \ldots C_{n,p}$, and a series charging impedance that includes a second series charging capacitor $C_{1,sa}, C_{2,sa}, \ldots C_{n,sa}$ and a series charging inductor $L_{1,sa}, L_{2,sa}, \ldots L_{n,sa}$. The inverter, in some embodiments, includes switches, such as metal-oxide-semiconductor field-effect transistors ("MOSFETs"). In some embodiments, the switches are in a full-bridge configuration. The inverter may also include a capacitor in parallel with the input terminals and may include other components, such as a lowpass filter. In some embodiments, the WPT charging apparatus includes one or more transformers, snubbers, zero-voltage switching controls and components, and the like. One of skill in the art will recognize other components compatible with the WPT charging apparatus.

The system includes a WPT receiver apparatus that includes a compensation section connected to a rectification section, which connects to a load (not shown). The load is typically a battery of a vehicle, but may connect to a motor, electronics, controls, etc. The compensation section includes a WPT receiver pad, represented by inductor $L_r$, a first series receiver capacitor $C_{r,sb}$, a parallel receiver capacitor $C_{r,p}$, and a second series receiver capacitor $C_{r,sa}$. The rectification circuit, in some embodiments, includes a diode rectifier. In other embodiments, the rectification circuit includes active switches instead of diodes where the system has power flow that is bidirectional. In some embodiments, the rectification circuit includes a lowpass filter with a DC inductor $L_{DC}$ and a DC capacitor $C_{DC}$. In other embodiments, the rectification section includes other components, such as snubbers, more components in the lowpass filter, an active converter section, a transformer, or the like. One of skill in the art will recognize other components compatible with the WPT receiver apparatus.

The WPT charging pad and the WPT receiver pad are configured to have a gap between the pads. In some embodiments, the gap is at least partially air. In other embodiments, a portion of the gap is asphalt, resin, or other covering for the WPT charging pads, which are typically stationary and may be mounted in a roadway.

Compared to the conventional circuit of FIG. 2, each branch has an additional series charging impedance with a compensation capacitor $C_{1,sa}$ (also referred to herein as a "second series charging capacitor") and inductor $L_{1,sa}$ (also referred to herein as a "series charging inductor") on the transmitter side, and an additional series compensation capacitor $C_{r,sa}$ (also referred to as a "second series receiver capacitor") at the receiver side. The purpose of the series compensation capacitor $C_{1,sa}$ and inductor $L_{1,sa}$ on the transmitter side is to decrease or increase an equivalent input voltage to the transmitter coils. By decreasing or increasing the equivalent input voltage, the proposed circuit can balance the current and voltage between the transmitter side and the receiver side components. As a result, the proposed circuit can achieve higher output power and higher efficiency compared to the conventional reflexive field containment circuit of FIG. 2.

Figure 3B:
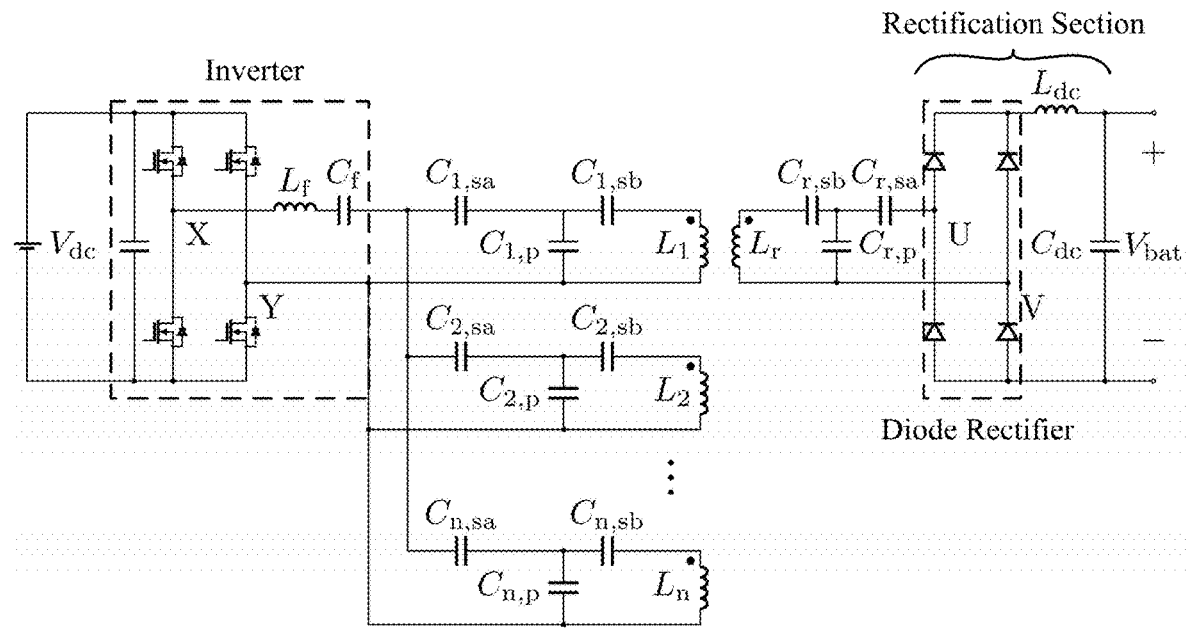
FIG. 3B is a circuit diagram illustrating a proposed reflexive field containment circuit topology with a series charging impedance with a capacitor, according to various embodiments.
Figure 3C:
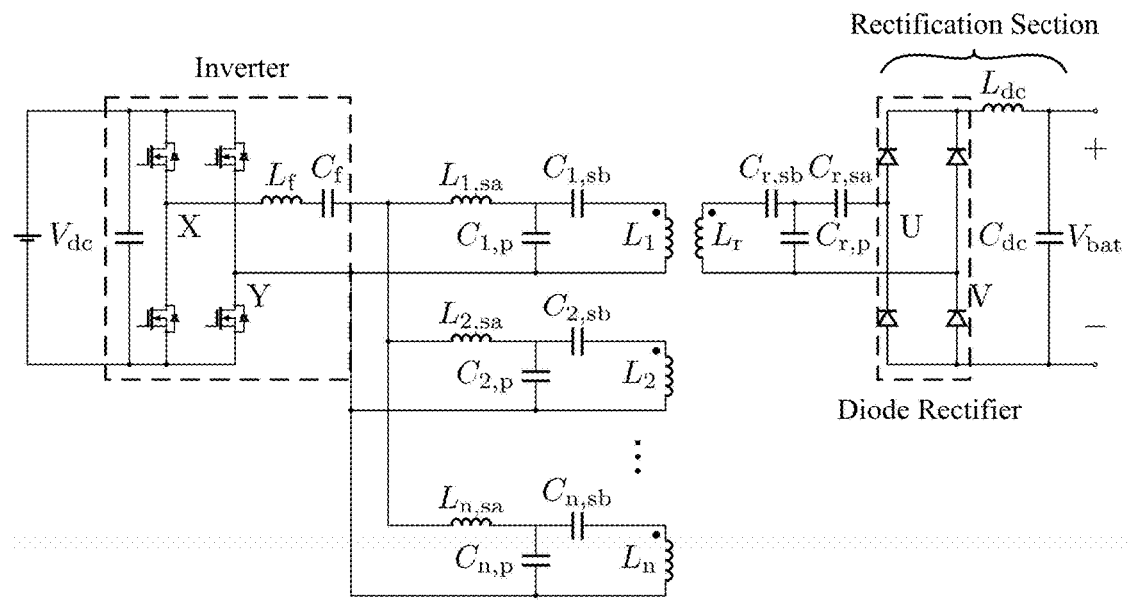
FIG. 3C is a circuit diagram illustrating a proposed reflexive field containment circuit topology with a series charging impedance with an inductor, according to various embodiments.

FIG. 3B is a circuit diagram illustrating a proposed reflexive field containment circuit topology with a series charging impedance with a capacitor, according to various embodiments. The series charging impedance includes the series compensation capacitor $C_{1,sa}$ without an inductor. The circuit of FIG. 3B is able to decrease the input equivalent voltage and decrease current in the WPT receiver pad. FIG. 3C is a circuit diagram illustrating a proposed reflexive field containment circuit topology with a series charging impedance with an inductor, according to various embodiments. The series charging impedance includes the inductor $L_{1,sa}$ without a capacitor. The circuit of FIG. 3C is able to increase the input equivalent voltage and to lower the WPT charging pad current.

The series compensation capacitor $C_{r,sa}$ on the receiver side can increase the reflected impedance utilized for the reflexive field containment function. The additional series compensation capacitor $C_{r,sa}$ solves the problem that the conventional reflexive field containment circuit needs to design output power and reflected impedance by only the ratio of $C_{r,p}$ and $C_{r,sb}$.

The proposed circuits of FIGS. 3A-3C have more degrees of freedom in its design because of the additional series compensation inductors and capacitors in the transmitter and receiver sides. The benefit of the proposed reflexive field containment topology is that a higher power design can be achieved while maintaining uncoupled currents at the same level compared to the conventional circuit by selecting proper input equivalent voltage and reflected impedance utilizing the additional compensation components.

II. THEORETICAL ANALYSIS OF THE PROPOSED CIRCUIT

In this section, the equations of output power and other aspects of the proposed reflexive field containment circuit are derived. Additionally, the Pareto fronts of the proposed and conventional reflexive field containment circuits are analyzed.

A. Fundamental Harmonic Analysis

Figure 4:
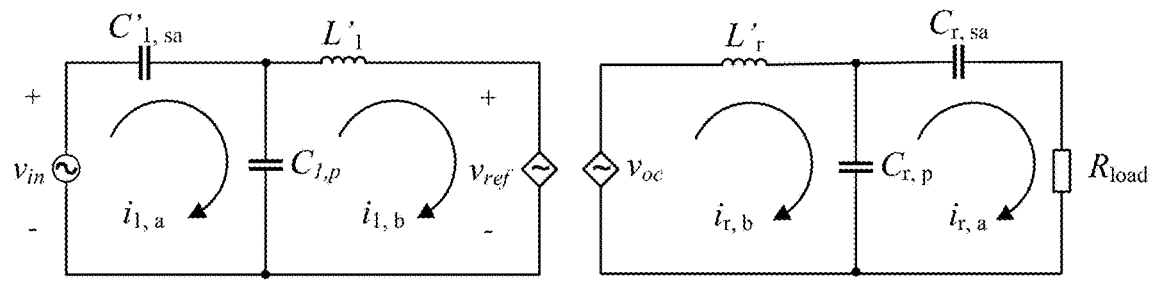
FIG. 4 is a circuit diagram illustrating an equivalent circuit during general conditions, according to various embodiments.

FIG. 4 is a circuit diagram illustrating an equivalent circuit during general conditions, according to various embodiments. The equivalent circuit is derived from FIG. 3A is shown in FIG. 4. For simplicity, only the first transmitter coil is considered in this analysis. To derive the relationship between the reflected impedance $Z_{ref}$ and compensation inductors and capacitors, circuit equations can be written in a matrix form as follows:

$$\begin{bmatrix} \frac{1}{j\omega C'_{1,sa}} + \frac{1}{j\omega C_{1,p}} & -\frac{1}{j\omega C_{1,p}} \\ -\frac{1}{j\omega C_{1,p}} & j\omega L'_1 + \frac{1}{j\omega C_{1,p}} \end{bmatrix} \cdot \begin{bmatrix} i_{1,a} \\ i_{1,b} \end{bmatrix} = \begin{bmatrix} v_{in} \\ -v_{ref} \end{bmatrix} \quad (1)$$

$$\begin{bmatrix} \frac{1}{j\omega C_{r,p}} + \frac{1}{-j\omega C_{r,sa}} + R_{load} & -\frac{1}{j\omega C_{r,p}} \\ -\frac{1}{j\omega C_{r,p}} & j\omega L'_r + \frac{1}{j\omega C_{r,p}} \end{bmatrix} \cdot \begin{bmatrix} i_{r,a} \\ i_{r,b} \end{bmatrix} = \begin{bmatrix} v_{oc} \\ 0 \end{bmatrix} \quad (2)$$

where $\omega$ is the angular switching frequency of the inverter, $v_{in}$ is the equivalent input voltage, $v_{ref}$ is the reflected voltage, $v_{oc}$ is the induced voltage, $R_{load}$ is the equivalent load resistance.

$C'_{1,sa}$, $L'_1$, and $L'_r$ are represented by $$C'_{1,sa} = \frac{C_{1,sa}}{1 - \omega^2 L_{1,sa} C_{1,sa}}, \quad (3)$$

$$L'_1 = L_1 - \frac{1}{\omega^2 C_{1,sb}}, \quad (4)$$

$$L'_r = L_r - \frac{1}{\omega^2 C_{r,sb}}. \quad (5)$$

The reflected voltage $v_{ref}$ and the induced voltage $v_{oc}$ are depicted by the diamond mark since they are dependent voltage sources, and represented by:

$$v_{ref} = -j\omega M_{1,r} i_{r,b} \quad (6)$$

$$v_{oc} = j\omega M_{1,r} i_{1,b} \quad (7)$$

where $$M_{1,r} = k_{1,r} \sqrt{L_1 L_r} \quad (8)$$

$M_{1,r}$ is the mutual inductance between the WPT charging pad and the WPT receiver pad. The fundamental harmonic of the inverter voltage $v_{in}$ and the rectifier voltage $v_{out}$ are represented in phasor notation as:

$$v_{in} = \frac{4V_{dc}}{\pi} e^{j\omega t}, \quad (9)$$

$$v_{out} = \frac{4v_{bat}}{\pi} e^{j\omega t}. \quad (10)$$

$L_f$ and $C_f$ are tuned as a bandpass filter for the inverter switching frequency $f_{sw}$ to reduce the switching loss at the inverter in the uncoupled condition. $L_f$ and $C_f$ can be designed by:

$$f_{sw} = \frac{1}{2\pi\sqrt{L_f C_f}}. \tag{11}$$

For the circuit of FIG. 3A, to reduce the number of design parameters in the proposed circuit, $n_1$, $n_2$, and $n_3$ are defined as follows. On the transmitter side, the ratio of $C_{1,p}$ and $C'_{1,sa}$ is defined by:

$$n_1 = \frac{C_{1,p}}{C'_{1,sa}} + 1 (n_1 > 0). \tag{12}$$

For the circuit of FIG. 3B where the series charging impedance is the second series charging capacitor $C_{1,sa}$, $n_1$ becomes:

$$n_1 = \frac{C_{1,p}}{C_{1,sa}} + 1 (n_1 > 0). \tag{12.1}$$

For the circuit of FIG. 3C where the series charging impedance is the second series charging inductor $L_{1,sa}$, $n_1$ becomes:

$$n_1 = -\omega^2 L_{1,sa} C_{1,p} + 1 (n_1 > 0). \tag{12.2}$$

On the receiver side, the ratio of $C_{r,p}$ and $C_{r,sb}$ is defined by:

$$n_2 = \frac{C_{r,p}}{C_{r,sb}} + 1 (n_2 > 1). \tag{13}$$

The ratio of $C_{r,p}$ and $C_{r,sa}$ is defined by $$n_3 = \frac{C_{r,p}}{C_{r,sa}} + 1 (n_3 > 1). \tag{14}$$

Note that when $n_1 = n_3 = 1$, the proposed circuit is identical to the conventional circuit.

For the equations above, the reflected impedance by $Z_{ref}$ is represented by:

$$Z_{ref} = \frac{v_{ref}}{i_{1,b}} = -j\omega M_{1,r} \frac{i_{r,b}}{i_{1,b}}. \tag{15}$$

At the receiver side, the resonant equation in the current loop $i_{r,b}$ shown in FIG. 4 is represented by:

$$\frac{1}{j\omega C_{r,p}} + j\omega L'_r = 0 \tag{16}$$

From equations (13), (14), and (16), all the compensation parameters at the receiver side $C_{r,sb}$, $C_{r,p}$, $C_{r,sa}$ are represented by:

$$C_{r,sb} = \frac{n_2}{L_r \omega^2 (n_2 - 1)} \tag{17}$$

$$C_{r,p} = \frac{n_2}{L_r \omega^2} \tag{18}$$

$$C_{r,sa} = \frac{n_2}{L_r \omega^2 (n_3 - 1)} \tag{19}$$

From equations (1), (2), (15), (7), (17), (18), and (19), the reflected impedance $Z_{ref}$ is represented by:

$$Z_{ref} = R_{ref} - jX_{ref} = \frac{k_{1,r}^2 L_1 R_{eq} n_2^2}{L_r} - j\omega k_{1,r}^2 L_1 n_2 n_3. \tag{20}$$

From equation (20), we can see the imaginary part of the reflected impedance $Z_{ref}$ can be designed by $n_2$ and $n_3$. Since the resonant status of the transmitter coil (e.g., WPT charging pad) is changed according to the imaginary part of the reflected impedance, the current gain of the transmitter coil can be designed using $n_2$ and $n_3$.

Figure 5:
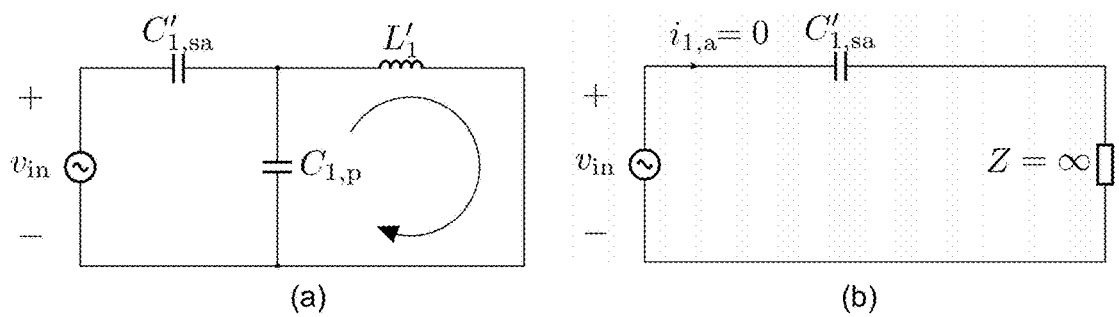
FIG. 5 includes circuit diagrams illustrating conversions of equivalent circuits of a wireless power transfer ("WPT") charging apparatus during an uncoupled condition, according to various embodiments.

FIG. 5 includes circuit diagrams illustrating conversions of equivalent circuits of a WPT charging apparatus during an uncoupled condition, according to various embodiments. FIG. 5 shows the equivalent circuit when inductance of the primary coil $L_1$ is uncoupled ($k_{1,r}=0$), for example, when the WPT receiver pad is not close to the WPT charger pad. FIG. 5(a) shows the resonant loop in the uncoupled condition. The reflected impedance $Z_{ref}$ is zero since $k_{1,r}$ is zero. To reduce the inverter loss from the uncoupled transmitter coil, the loop is designed to be at resonance. Hence, the circuit equation is written as by:

$$j\omega L'_1 + \frac{1}{j\omega C_{1,p}} = 0. \tag{21}$$

Figure 6:
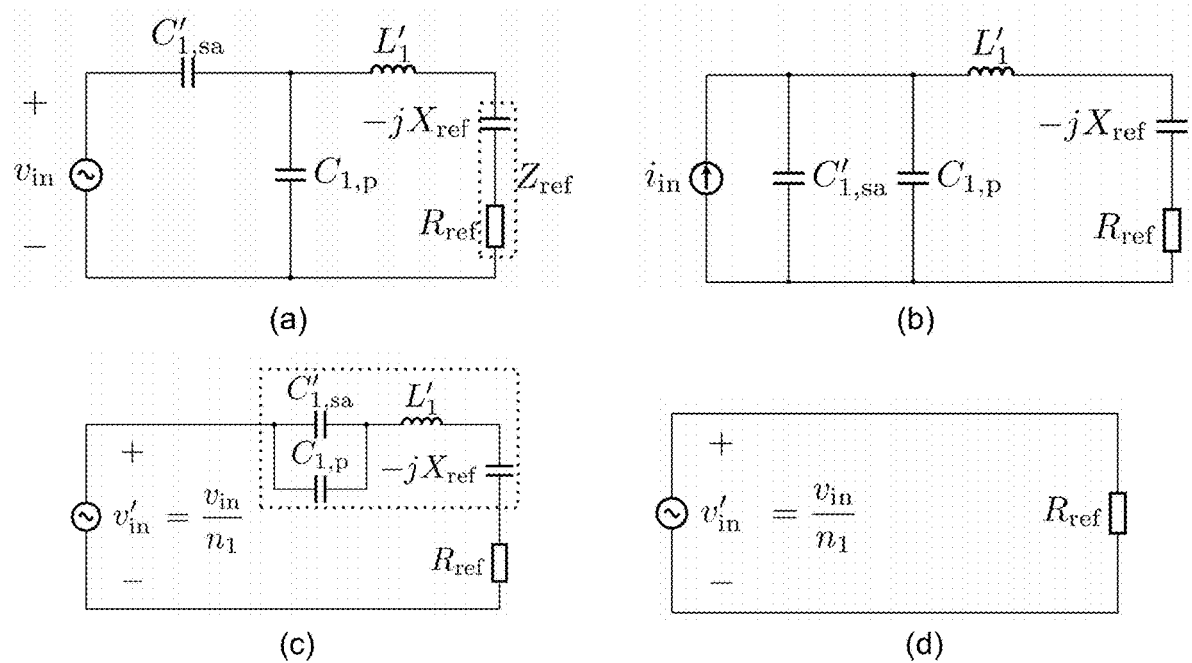
FIG. 6 includes circuit diagrams illustrating conversions of equivalent circuits of the WPT transmitter apparatus during a coupled condition, according to various embodiments.

The total impedance Z of the parallel connection of by parallel capacitance $C_{1,p}$ and inductance $L'_1$ can be assumed as infinite. The equivalent circuit in the uncoupled condition can be redrawn as shown in FIG. 5(b). Since the equivalent impedance Z=∞, the inverter current $i_{1,sa}$ becomes zero. Hence, the inverter losses due to uncoupled transmitter coil branches are negligible if the harmonic component of the inverter current is small enough due to the attenuation provided by the band pass filter. The equivalent circuits of the transmitter side when the primary coil $L_1$ is coupled and the primary tuning circuit is perfectly tuned ($k_{1,r}=k_{peak}$) is shown in FIG. 6. FIG. 6 includes circuit diagrams illustrating conversions of equivalent circuits of the WPT transmitter apparatus during a coupled condition, according to various embodiments. FIG. 6(a) is a simplified equivalent circuit of the transmitter side converted from FIG. 4. Using Norton's theorem, the voltage source is converted to the equivalent current source and the equivalent circuit FIG. 6(a) can be converted to FIG. 6(b). The equivalent current source $i_{in}$ is represented by:

$$i_{in} = j\omega C'_{1,sa} v_{in} \tag{22}$$

Using Thevenin's theorem, the equivalent current source is converted to the equivalent voltage source and FIG. 6(b) can be converted to FIG. 6(c). The equivalent input voltage $v_{in}$ is represented by:

$$v'_{in} = \frac{C'_{1,sa}}{C'_{1,sa} + C_{1,p}} v_{in} = \frac{v_{in}}{n_1} \quad (23)$$

The following equation is satisfied since the equivalent circuit is in the fully resonated condition.

$$\frac{1}{j\omega(C_{1,p} + C'_{1,sa})} + j\omega L'_1 - jX_{ref} = 0. \quad (24)$$

From the final equivalent circuit in FIG. 6(d), We can see that $v'_{in}$ can be decreased or increased by $n_1$ to achieve proper voltage for the reflected resistance $R_{ref}$.

From equations (12), (21), and (24), $C'_{1,sa}$, $C_{1,sb}$, and $C_{1,p}$ are derived as:

$$C'_{1,sa} = \frac{1}{\omega^2 k_{peak}^2 L_1 n_1 (n_1 - 1) n_2 n_3} \quad (25)$$

$$C_{1,sb} = \frac{1}{\omega^2 L_1 (1 - k_{peak}^2 n_1 n_2 n_3)}, \quad (26)$$

$$C_{1,p} = \frac{1}{\omega^2 k_{peak}^2 n_1 n_2 n_3}. \quad (27)$$

From the equations above, loop currents $i_{1,a}$, $i_{1,b}$, $i_{r,a}$, and $i_{r,b}$ can be written as:

$$i_{1,a} = \frac{k_{1,r}^2(\omega L_r n_3 + jR_{load} n_2)}{\omega k_{peak}^2 L_1 n_1^2 n_2 n_3 \{k_{1,r}^2 R_{load} n_2 + j\omega L_r (k_{peak}^2 - k_{1,r}^2) n_3\}} v_{in} \quad (28)$$

$$i_{1,b} = \frac{L_r}{L_1 n_1 n_2 \{k_{1,r}^2 R_{load} n_2 + j\omega (k_{peak}^2 - k_{1,r}^2) L_r n_3\}} v_{in} \quad (29)$$

$$i_{r,a} = \frac{\sqrt{L_r} k_{1,r}}{\sqrt{L_1} n_1 \{k_{1,r}^2 R_{load} n_2 + j\omega (k_{peak}^2 - k_{1,r}^2) L_r n_3\}} v_{in} \quad (30)$$

$$i_{r,b} = \frac{k_{1,r}(\omega L_r n_3 + jR_{load} n_2)}{\sqrt{L_1 L_r} n_1 \{k_{1,r}^2 R_{load} n_2 + j\omega (k_{peak}^2 - k_{1,r}^2) L_r n_3\}} v_{in}. \quad (31)$$

The loop current in the fully coupled condition can be written as:

$$i_{1,a}|_{k_{1,r}=k_{peak}} = \frac{\omega L_r n_3 + jR_{load} n_2}{\omega L_1 k_{peak}^2 n_1^2 n_2^2 n_3 R_{load}} v_{in} \quad (32)$$

$$i_{1,b}|_{k_{1,r}=k_{peak}} = \frac{L_r}{k_{peak}^2 L_1 R_{load} n_1 n_2^2} v_{in} \quad (33)$$

$$i_{r,a}|_{k_{1,r}=k_{peak}} = \frac{\sqrt{L_r}}{k_{peak} \sqrt{L_1} R_{load} n_1 n_2} v_{in} \quad (34)$$

$$i_{r,b}|_{k_{1,r}=k_{peak}} = \frac{\omega L_r n_3 + jR_{load} n_2}{\omega k_{peak} \sqrt{L_1 L_r} R_{load} n_1 n_2} v_{in}. \quad (35)$$

The inverter current $i_{1,a}$ and the transmitter current $i_{1,b}$ in uncoupled conditions can be calculated by substituting $k_{1,r}=0$ to equations (30) and (31) as shown below.

$$i_{1,a}|_{k_{1,r}=0} = 0 \quad (36)$$

$$i_{1,b}|_{k_{1,r}=0} = \frac{v_{in}}{j\omega k_{peak}^2 L_1 n_1 n_2 n_3}. \quad (37)$$

Output equivalent resistance $R_{load}$ can be represented as:

$$R_{load} = \frac{V_{out}}{i_{r,a}} \quad (38)$$

From equations (30) and (38), the equivalent load resistance $R_{load}$ can be rewritten as:

$$R_{load} = \frac{\omega \sqrt{L_1} L_r (k_{peak}^2 - k_{1,r}^2) n_1 n_3 v_{out}}{k_{1,r} \sqrt{L_r v_{in}^2 - k_{1,r}^2 L_1 n_1^2 n_2^2 v_{out}^2}}. \quad (39)$$

Finally, from equations (30) and (39), output power $P_{out}$ can be calculated by:

$$P_{out} = i_{r,a} \cdot i_{r,a}^* \cdot \frac{R_{load}}{2} \quad (40)$$

$$= \frac{k_{1,r}^2 L_r R_{load} v_{in}^2}{2 L_1 n_1^2 \{k_{1,r}^4 R_{load}^2 n_2^2 + \omega^2 (k_{peak}^2 - k_{1,r}^2)^2 L_r^2 n_3^2\}}.$$

The output power in the fully coupled condition can be written as:

$$P_{out}|_{k_{1,r}=k_{peak}} = \frac{L_r v_{in}^2}{2 k_{peak}^2 L_1 R_{load} n_1^2 n_2^2}. \quad (41)$$

Using the equation of $i_{1,b}$ and $P_{out}$, the transmitter current gain and output power can be designed simultaneously. Also, system efficiency can be estimated and designed by the equations of the loop current. By applying $n_1=n_3=1$, the derived equations can be used for the conventional circuit as well.

In some embodiments, $n_1$ is in the range of 0 to 0.9 or greater than 1.1, which provides separation from the conventional circuit of FIG. 2. In other embodiments, $n_1$ is in the range of 0 to 0.8 or greater than 1.2 to provide even more separation and advantages. In other embodiments, $n_3$ is greater than 1.1. In other embodiments, $n_3$ is greater than 1.2 to provide more separation and greater advantages over the conventional circuit of FIG. 2.

Figure 7:
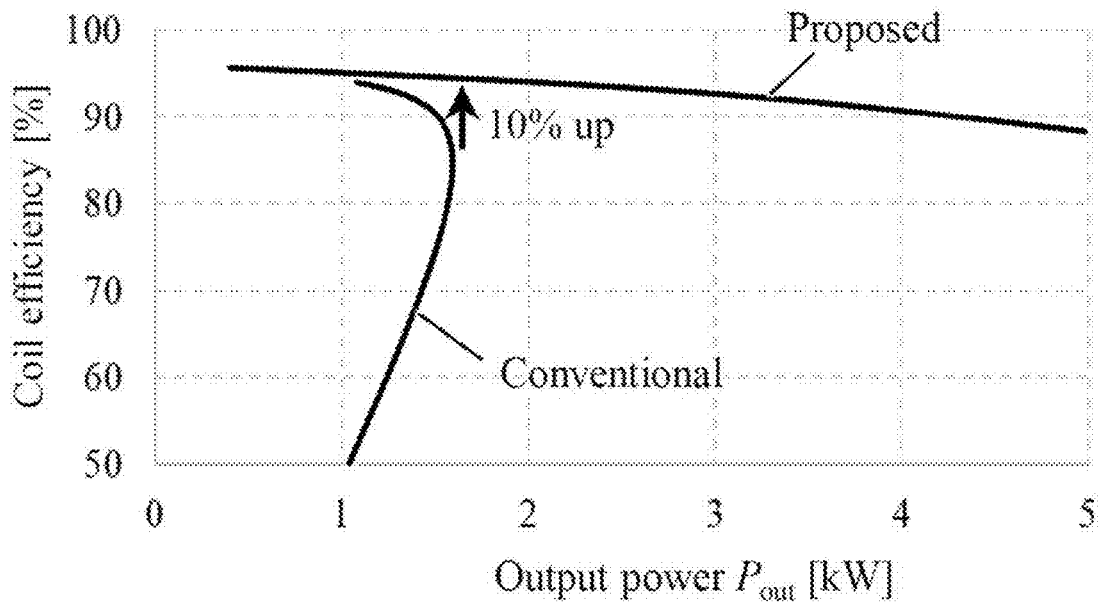
FIG. 7 is a diagram illustrating Pareto fronts of the proposed circuit design and the conventional circuit showing efficiency versus output power Pout, according to various embodiments.

B. Comparison of the Pareto Fronts of the Proposed and Conventional Reflexive Field Containment Circuit To compare between the conventional and the proposed circuit designs, design points are plotted on the surface of coil efficiency versus output power $P_{out}$ as shown in FIG. 7. FIG. 7 is a diagram illustrating Pareto fronts of the proposed circuit design and the conventional circuit showing efficiency versus output power $P_{out}$, according to various embodiments. $P_{out}$ is calculated by equation (40). Efficiency is calculated by equations (28), (29), (30), and (31). As the fixed design requirements, the following values are used for both designs: $L_1=L_2=18.42$ microhenries ("µH"), $L_r=43.85$ µH, $k_{1,r}=0$~0.120, $k_{peak}=0.124$~0.130, $Q_L=400$, $Q_C=800$. The low voltage (50 volts ("V")) was used for input and output voltage to facilitate the experiment. In the proposed reflexive field containment circuit design plots, $n_1$, $n_2$, and $n_3$ are randomly selected from $0<n_1<1$, $1<n_2<10$, and $1<n_3<10$. In the conventional reflexive field containment circuit design plots, $n_1$, $n_2$, and $n_3$ are randomly selected from $n_1=1$, $1<n_2<10$, and $n_3=1$. The two lines show the Pareto fronts of the proposed and conventional circuits. Because the conventional circuit needs to design its function by only $n_2$, the maximum output power is much lower than the proposed circuit. From the graph, we can see that the proposed circuit has an advantage in the high output power area over approximately 1.6 kW in this design requirement case.

III. PROTOTYPE DESIGN

To show the advantage of the proposed converter over the conventional reflexive field containment circuit, both the designs are simulated under the same operating conditions.

TABLE I

Design specifications for the proposed circuit

| Parameter | Variable | Value |
|---|---|---|
| Input voltage | $V_{dc}$ | 50 V |
| Output voltage | $V_{bat}$ | 50 V |
| Air gap | $z_{gap}$ | 250 mm |
| Switching frequency | $f_{sw}$ | 85 kHz |
| Coupling factor between $L_1$ and $L_r$ | $k_{1,r}$ | 0.0–0.12 |
| Coupling factor between $L_1$ and $L_2$ | $k_{1,3}$ | −0.04 |
| Transmitter coil inductance | $L_1$ & $L_2$ | 18.42 μH |
| Receiver coil inductance | $L_r$ | 43.85 μH |
| Bandpass filter inductor | $L_f$ | 5.05 μH |
| Bandpass filter capacitor | $C_f$ | 0.71 μC |
| Output DC inductor | $L_{dc}$ | 10.33 μH |
| Parasitic inductance of wires | $L_{para,wire}$ | 0.10 μH |
| Parasitic inductance of capacitors | $L_{para,C}$ | 0.10 μH |
| Quality factor of wireless coils and inductors | $Q_L$ | 400 |
| Quality factor of capacitors | $Q_C$ | 800 |
| Number of turns of the transmitter coils | $N_{L1}$ & $L_{L2}$ | 3 |
| Number of turns of the receiver coil | $N_{Lr}$ | 5 |

The design requirements are shown in TABLE I. The input voltage $V_{dc}$ and output voltage $V_{bat}$ are set at 50 V. A frequency of 85 kHz is selected as the transmission frequency $f_{sw}$ for the prototype designed to follow the Society of Automotive Engineers ("SAE") standard. The coupling factor between the transmitter coil and the receiver coil $k_{1,r}$ varies from 0 to 0.12, according to the position of the receiver coil due to longitudinal misalignment. The range of coupling factor $k_{1,r}$ was extracted from Maxwell-simulations. The quality factors of coils and capacitors $Q_L$ and $Q_C$ are defined as:

$$QL = \frac{\omega L}{R_L} \text{ and } Q_c = \frac{1}{\omega C R_C} \quad (42)$$

where $R_L$ and $R_C$ are the equivalent series resistance of L and C respectively. The parasitic inductance of wires between each components is defined as $L_{para,wire}$, and the parasitic inductance of capacitor banks is defined as $L_{para,C}$.

The designed parameters of the proposed and the conventional circuit are shown in TABLE II. Circuits were designed such that the amplitude of the uncoupled transmitter current $I_{L1,uncoupled}$ is 37 A in both the cases. $n_2$ is set to the same value ($n_2=8.93$) between the two circuits to compare in the same design condition. $n_1$ and $n_3$ are set to 1 in the conventional circuit since the conventional circuit does not have $C_{1,sa}$, $L_{1,sa}$, and $C_{r,sa}$.

TABLE II

Design conditions for the proposed and conventional circuits

| Parameter | Proposed | Conventional |
|---|---|---|
| $n_1$ | 1.28 | 1.00 |
| $n_2$ | 8.93 | 8.93 |
| $n_3$ | 1.46 | 1.00 |
| Series charging inductor $L_{1,sa}$ | 1.14 μH | — |
| Series charging capacitor $C_{1,sa}$ | 1.60 μH | — |
| Series charging capacitor $C_{2,sa}$ | 239 μF | 236 μF |
| Parallel charging capacitor $C_{1,p}$ | 1.02 μF | 0.99 μF |
| Series charging capacitor $C_{r,sa}$ | 1.54 μF | — |
| Series charging capacitor $C_{r,sa}$ | 90 μF | 90 μF |
| Parallel charging capacitor $C_{r,p}$ | 711 μF | 711 μF |

Figure 8:
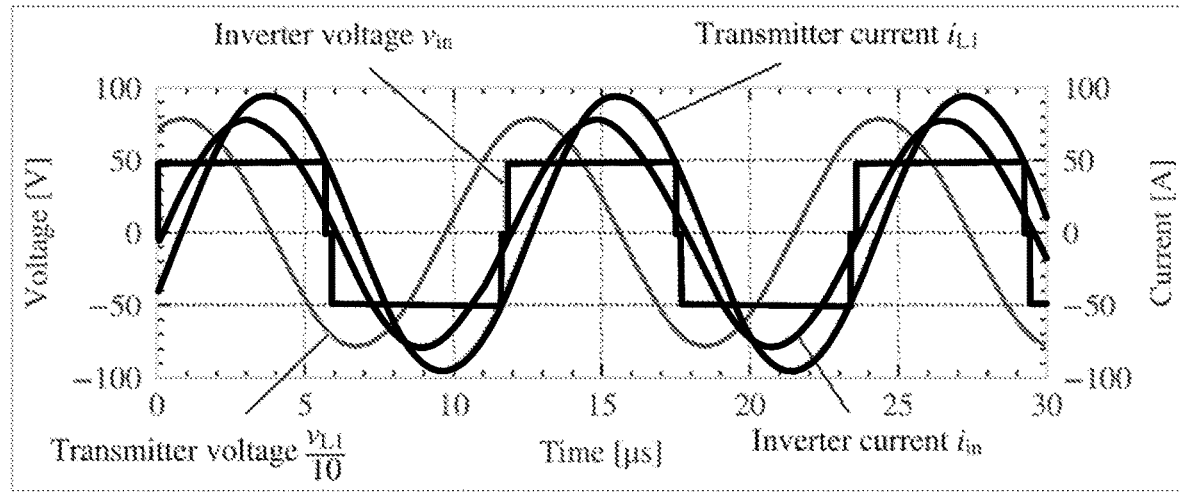
FIG. 8 illustrates circuit simulation results for the coupled condition and the uncoupled condition, according to various embodiments.
Figure 8:
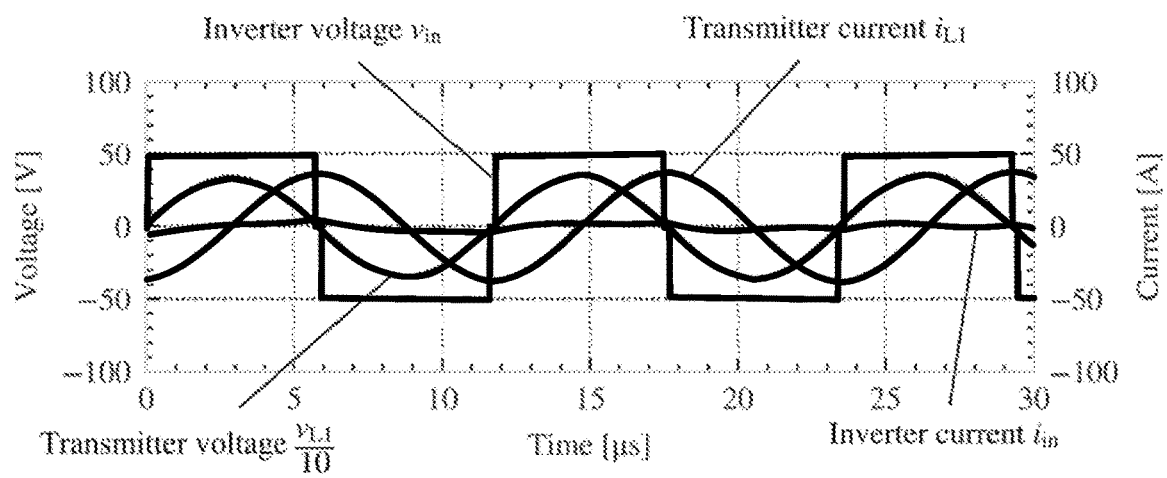

FIG. 8 illustrates circuit simulation results for the coupled condition and the uncoupled condition, according to various embodiments. LTspice simulation results of the proposed circuit are shown in FIG. 8. LTspice® is a circuit simulation program. FIG. 8(a) shows waveforms in a coupled condition ($k_{1,r}=k_{peak}$). The transmitter current becomes maximum, and the amplitude is 96 amperes ("A"). As the inverter current inn is lagging the inverter voltage $v_{in}$, the inverter current $i_{in}$ maintains a soft-switching condition. Output power at the coupled condition is 2,022 W. FIG. 8(b) shows waveforms in an uncoupled condition ($k_{1,r}=0$). The amplitude of the transmitter current $i_{L1}$ is minimum and its values is 37 A. The inverter current $i_{in}$ is close to zero since the impedance of the compensation circuit from the inverter side can be assumed as infinite in the uncoupled condition.

Figure 9:
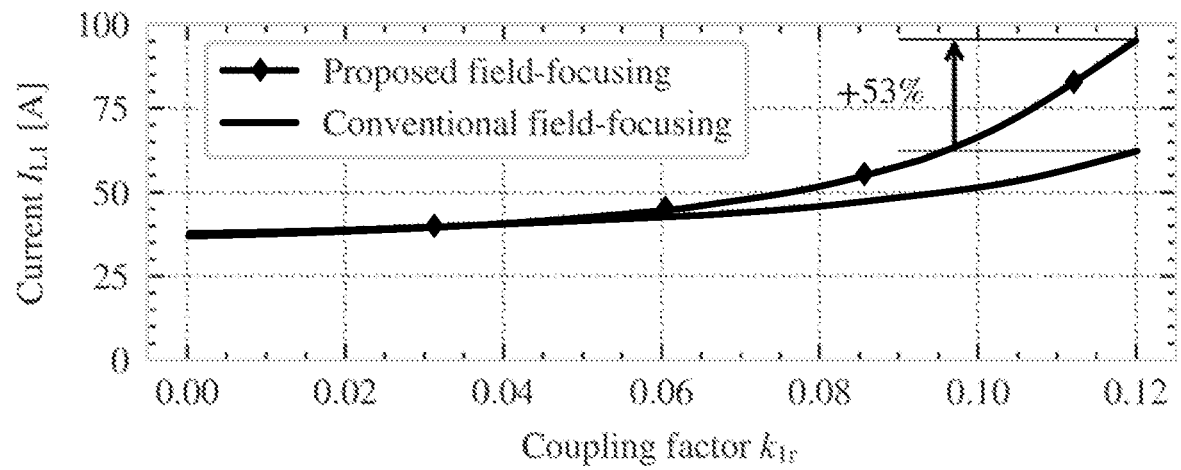
FIG. 9 illustrates circuit simulation results comparing current amplitude in the WPT transmission pad for the proposed and conventional reflexive field containment circuits, according to various embodiments.

FIG. 9 illustrates circuit simulation results comparing current amplitude in the WPT transmission pad for the proposed and conventional reflexive field containment circuits, according to various embodiments. Sweep results of current amplitude $I_{L1}$ with respect to coupling factor $k_{1,r}$ from 0 to 0.12 are shown in FIG. 9. The line with the diamond is the proposed circuit and the solid line is the conventional circuit. In the uncoupled condition ($k_{1,r}=0$), the current amplitudes of both circuit are the same ($I_{L1,uncoupled}=37$ A). In the coupled condition ($k_{1,r}=k_{peak}=0.12$), current amplitude of the proposed one is 53% higher than the conventional one.

Figure 10:
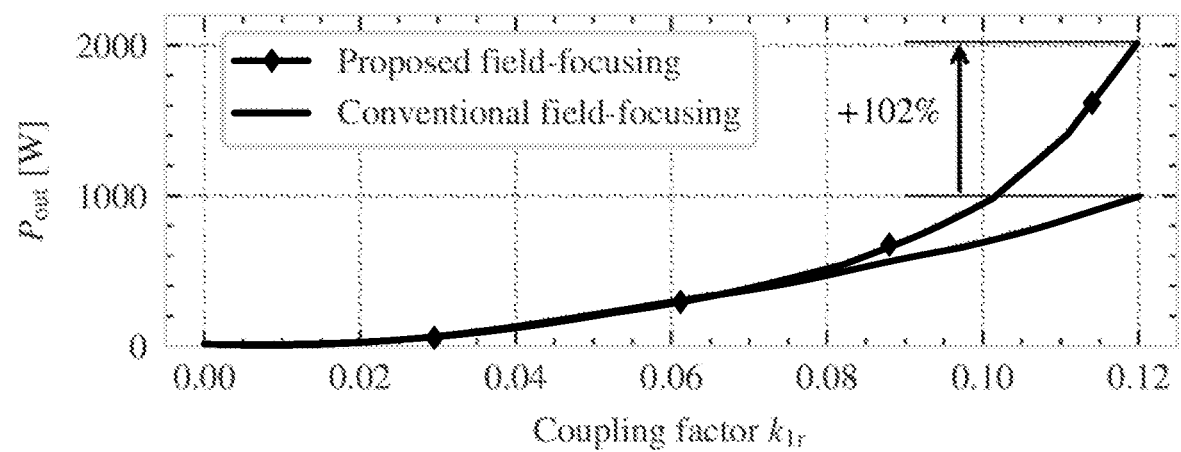
FIG. 10 illustrates circuit simulation results comparing power output for the proposed and conventional reflexive field containment circuits, according to various embodiments.

FIG. 10 illustrates circuit simulation results comparing power output for the proposed and conventional reflexive field containment circuits, according to various embodiments. Sweep results of output power $P_{out}$ with respect to coupling factor $k_{1,r}$ from 0 to 0.12 are shown in FIG. 10. In the coupled condition ($k_{1,r}=k_{peak}$), the output power of the proposed solution is 102% higher than the conventional case.

IV. EXPERIMENTAL VALIDATION

An experiment was conducted to validate the design of the proposed circuit of FIG. 3A. A prototype of the proposed circuit was constructed with the coil parameters and the compensation parameters in TABLE I and TABLE II. An aluminum backplate of 750 mm×850 mm used for shielding is placed in a bottom layer, and a ferrite plate of 650 mm×850 mm is placed in a middle layer and centered on the aluminum plate. A transmitter coil embedded in a coil former is placed on a top layer. The horizontal spacing between the transmitter coils is kept small (45 mm) to mitigate the decrease in the output power in the region between the coils due to lower coupling. The receiver coil structure is similar to the transmitter coil, but an aluminum plate of the receiver is 725 mm×725 mm and a ferrite plate is 675 mm×675 mm. The ferrite plate dimensions are larger than the winding to increase the coupling, and the aluminum plate dimensions are larger than the ferrite plate to decrease the stray field. The thickness of the ferrite plates is 5 mm and that of the aluminum plates is 2 mm. The transmitter plates are separated by the receiver plate by 250 mm. The coils are 7 mm diameter Litz wires. Coil formers are made of high-density polyethylene (HDPE) sheets and the Litz wires are embedded into them.

The prototype consists of two transmitter coils connected to compensation circuits, an inverter, a receiver coil, and a diode rectifier. To create a similar environment that replicates the intended application, adjacent coils are placed next to the transmitter coil $L_1$ and $L_2$, respectively. This simulates the application of a DWPT system on the road. Magnetic stray field are measured at the observation point shown in FIG. 14(a) using a field analyzer (model EHP-200 A/AC). The output power and transmitter current are measured as the receiver coil is moved from the center of the transmitter coil $L_1$ to the center of the transmitter coil $L_2$ in the longitudinal direction.

Figure 11:
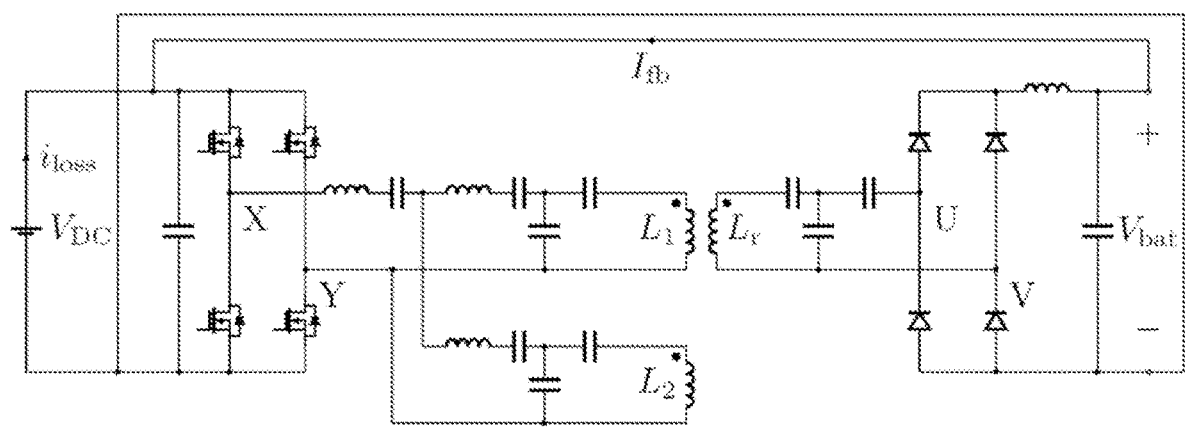
FIG. 11 is a circuit diagram illustrating an experimental setup for the proposed reflexive field containment circuit topology, according to various embodiments.

FIG. 11 is a circuit diagram illustrating an experimental setup for the proposed reflexive field containment circuit topology, according to various embodiments. The diagram of the test setup with power feedback at the dc link is shown in FIG. 11.

The series compensation inductor $L_{1,sa}$ is added in series at $C_{1,sa}$ to cancel the effect of the parasitic inductance along the transmitter lines. In a practical system, these individual transmitter coils may be several meters away and each line to connect each transmitter coil and inverter has different lengths of wires. Then the inductance of the lines connecting to the resonators can significantly detune and unbalance the system. The added series inductors are utilized to adjust and compensate the unbalance of inductance.

The power feedback via a dc wire allows circulating the transferred power within the system, instead of dissipating the power in a resistive load. While the transferred power is circulated, total losses are drawn from the external dc supply. Therefore, the DC current $I_{loss}$ and the dc supply voltage $V_{dc}$ can be measured to calculate the total power losses. The transferred power is calculated using the measured feedback current $I_{fb}$. All wireless coils and inductors were made from 2325-strand American Wire Gauge ("AWG") 38 Litz-wire. Because of the small core loss and the large saturation flux density, Manganese-Zinc ("MnZn") ferrite core (material PC95) by TDK® was used for the magnetic material of the wireless coils and inductors. A general-purpose full-bridge inverter is used on the primary side to provide the ac excitation. It contains two silicon carbide ("SiC") half-bridge MOSFET module (model number CAS325M12HM2) with a rating voltage of 1.2 kV. The same SiC MOSFET modules are used as the diode rectifier as well.

Figure 12:
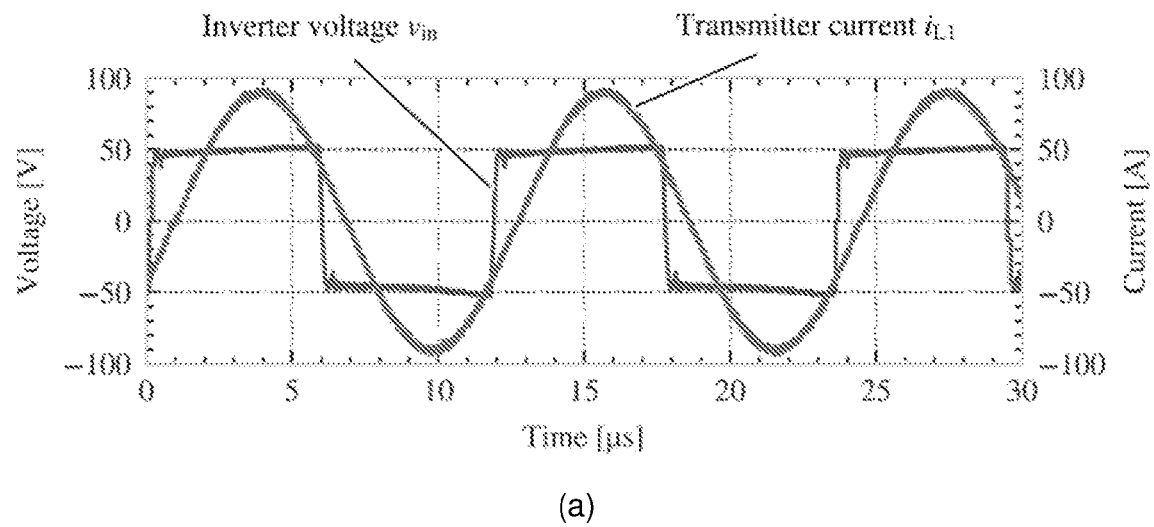
FIG. 12 illustrates experimental waveforms in the coupled condition and uncoupled condition, according to various embodiments.
Figure 12:
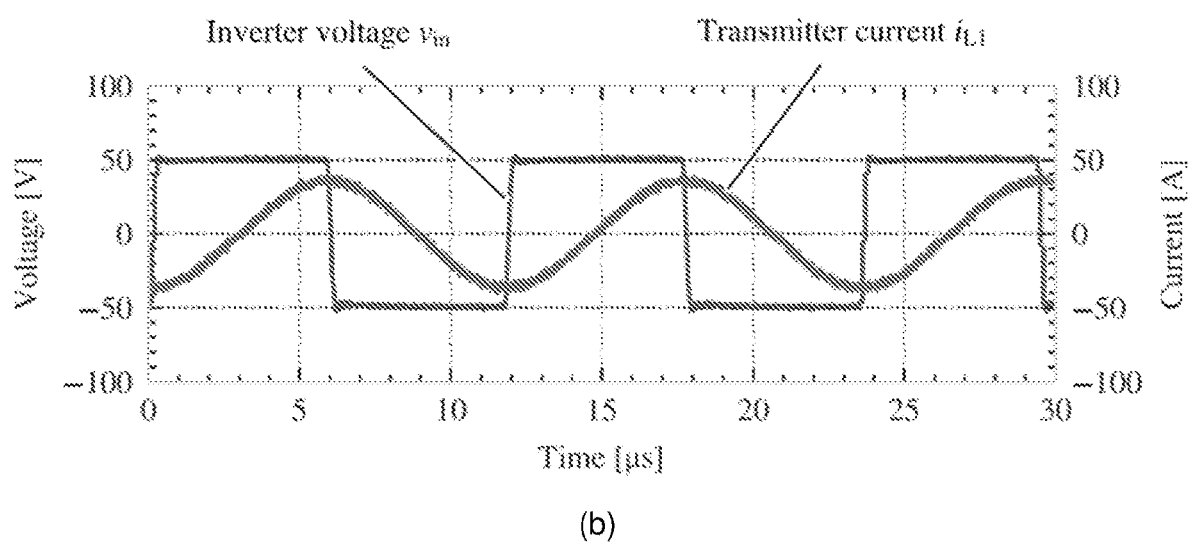

FIG. 12 illustrates experimental waveforms in the coupled condition and uncoupled condition, according to various embodiments. The voltage of the inverter $v_{in}$ and the current of the transmitter coil $i_{L1}$ are shown in FIG. 12. FIG. 12(a) shows the waveforms when the receiver coil is at the center of the transmitter coil $L_1$. The measured amplitude of the current is 92 A and the output power is 1,952 W. FIG. 12(b) shows the waveforms in uncoupled conditions. The output power is 0 W, and the amplitude of the current is 37 A. Therefore, the amplitude of the transmitter current in the coupled case is 2.5 times that of the uncoupled case.

Figure 13:
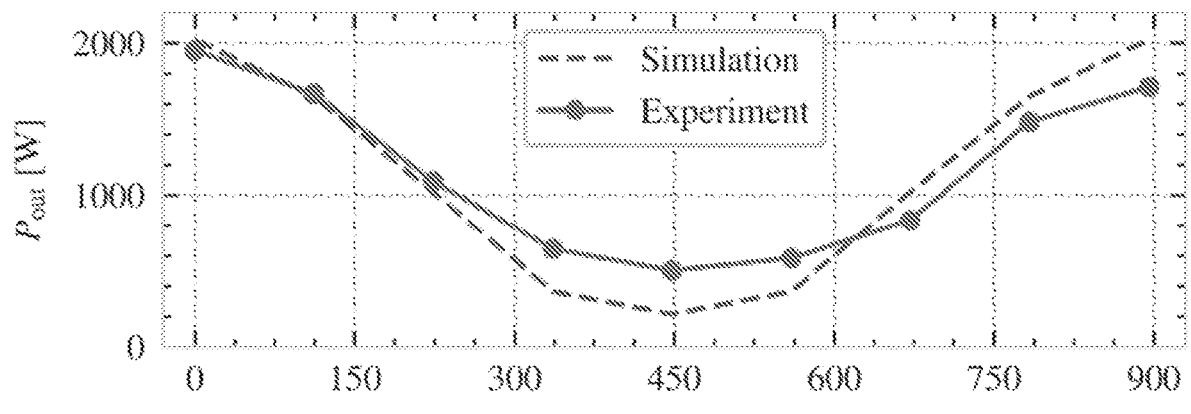
FIG. 13 illustrates a comparison of simulated results and experimental results for output power as receiver position changes from the center of a first WPT transmission pad to the center of a second WPT transmission pad, according to various embodiments.
Figure 13:
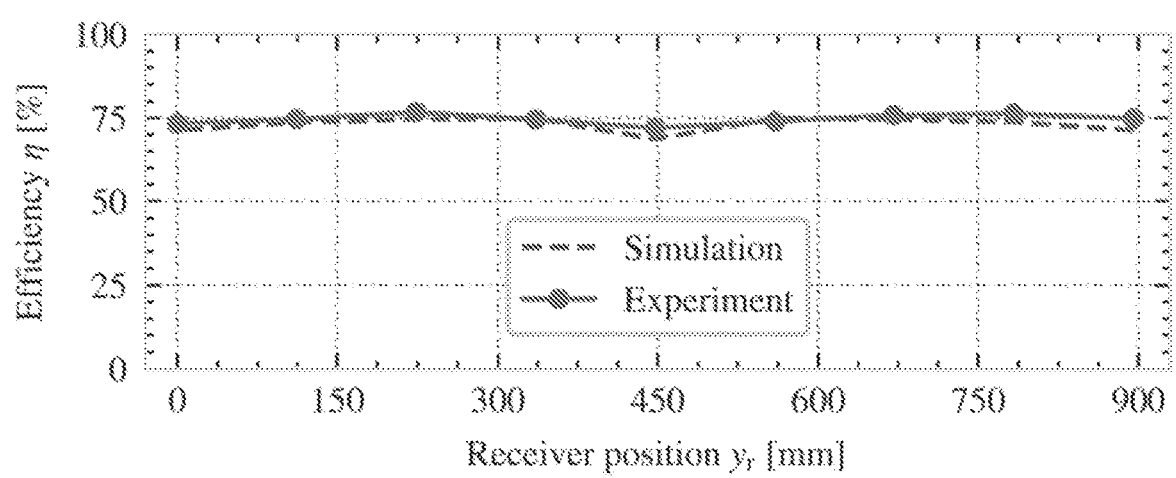

FIG. 13 illustrates a comparison of simulated results and experimental results for output power as receiver position changes from the center of a first WPT transmission pad to the center of a second WPT transmission pad, according to various embodiments. To verify the reflexive field containment capability of the system, the transmitter current and output power are measured as the receiver coil moves along the track. FIG. 13 shows the measured output power and DC-DC efficiency of the proposed circuit as the receiver coil moves with respect to the transmitter coils. FIG. 13 (a) shows the measured output power versus receiver position $y_r$. At $y_r$=0 mm, the measured output power matches well with the simulation value, which is calculated by the LTspice simulation described above. However, the measured output power at $y_r$=895 mm is 14% less than the measured value at $y_r$=0 mm because of an unbalance in the length of wires and compensation circuit between the inverter and transmitter coils. FIG. 13(b) shows the measured DC-DC efficiency of the proposed circuit versus receiver position $y_r$. The measured efficiencies is 74.9% at $y_r$=0 mm when output power is 1,952 W and matches well with the simulation values along with all ranges of the receiver position.

Figure 14:
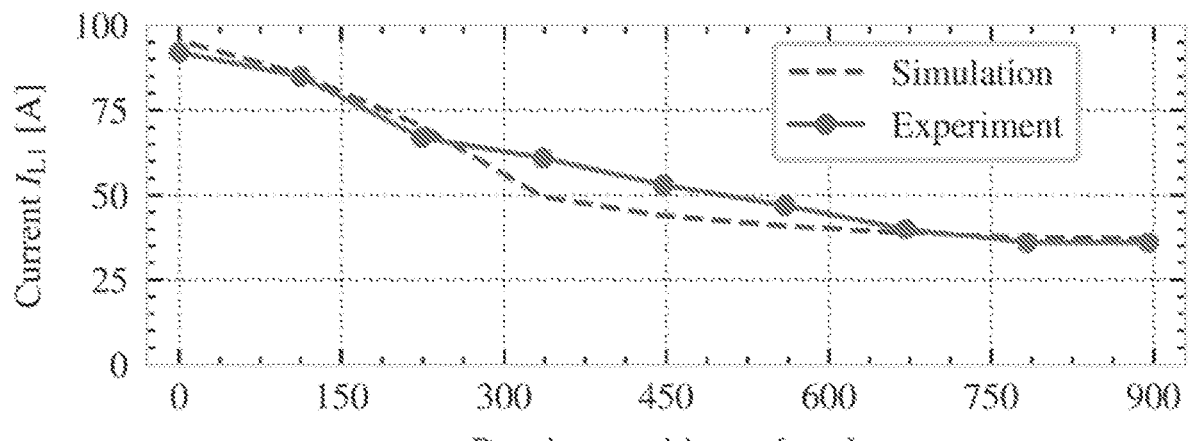
FIG. 14 illustrates a comparison of simulated results and experimental results for WPT transmission pad current for the first WPT transmission pad and the second WPT transmission pad as receiver position changes from the center of the first WPT transmission pad to the center of the second WPT transmission pad, according to various embodiments.
Figure 14:
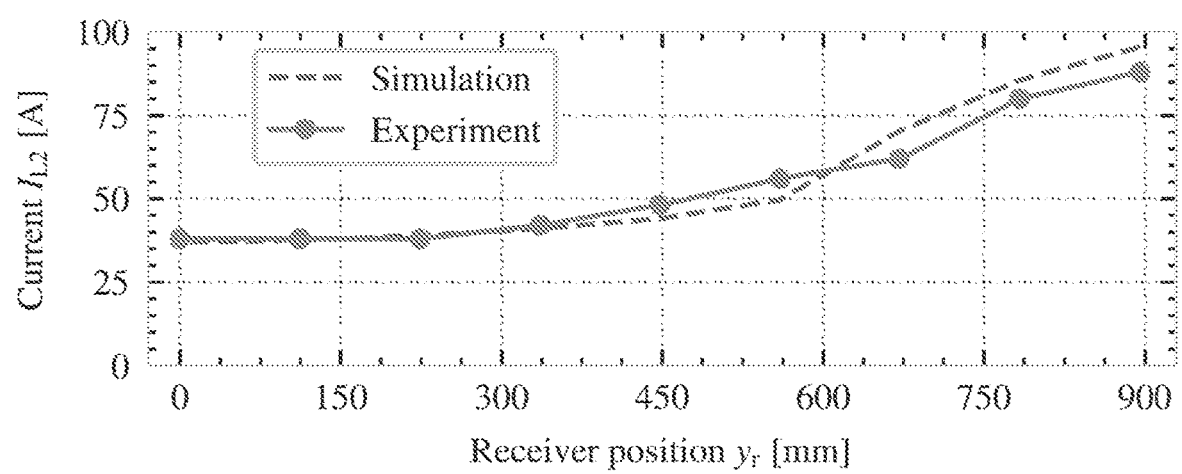

FIG. 14 illustrates a comparison of simulated results and experimental results for WPT transmission pad current for the first WPT transmission pad and the second WPT transmission pad as receiver position changes from the center of the first WPT transmission pad to the center of the second WPT transmission pad, according to various embodiments. The measured amplitude of the transmitter current at different receiver positions is shown in FIGS. 14(a) and (b). As seen from FIG. 13 and FIG. 14, the experimental results match with the simulation results.

Figure 15:
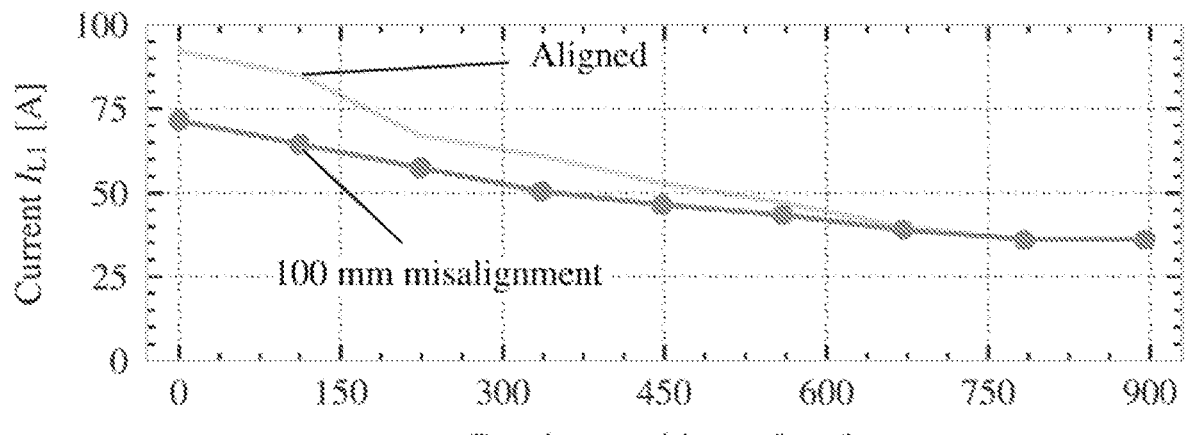
FIG. 15 illustrates experimental results for WPT transmission pad current for the first WPT transmission pad and the second WPT transmission pad as receiver position changes from the center of the first WPT transmission pad to the center of the second WPT transmission pad for different alignment conditions, according to various embodiments.
Figure 15:
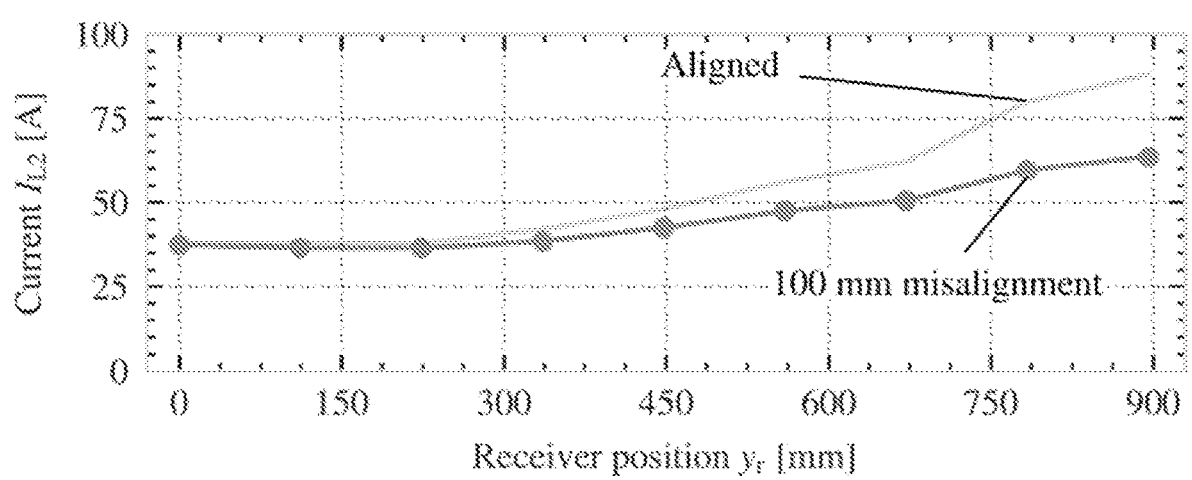

FIG. 15 illustrates experimental results for WPT transmission pad current for the first WPT transmission pad and the second WPT transmission pad as receiver position changes from the center of the first WPT transmission pad to the center of the second WPT transmission pad for different alignment conditions, according to various embodiments. To verify the tolerance of the proposed circuit to misalignment in the lateral direction, transmitter current and output power have been measured with 100 mm misalignment in the lateral direction ($x_r$=−100 mm). FIG. 15 shows the measured transmitter coil current with 100 mm misalignment. FIG. 15(a) shows the current amplitude of the transmitter coil $L_1$ with respect to the receiver position at 100 mm misalignment. At $y_r$=0 mm, the amplitude is 72 A. The current gain of transmitter coil $L_1$ is reduced by 22%. FIG. 15(b) shows the current amplitude of transmitter coil $L_2$ with respect to receiver position at 100 mm misalignment. In the same way, at $y_r$=0 mm, the amplitude is 64 A. The current gain of transmitter coil $L_1$ is reduced by 28%.

Figure 16:
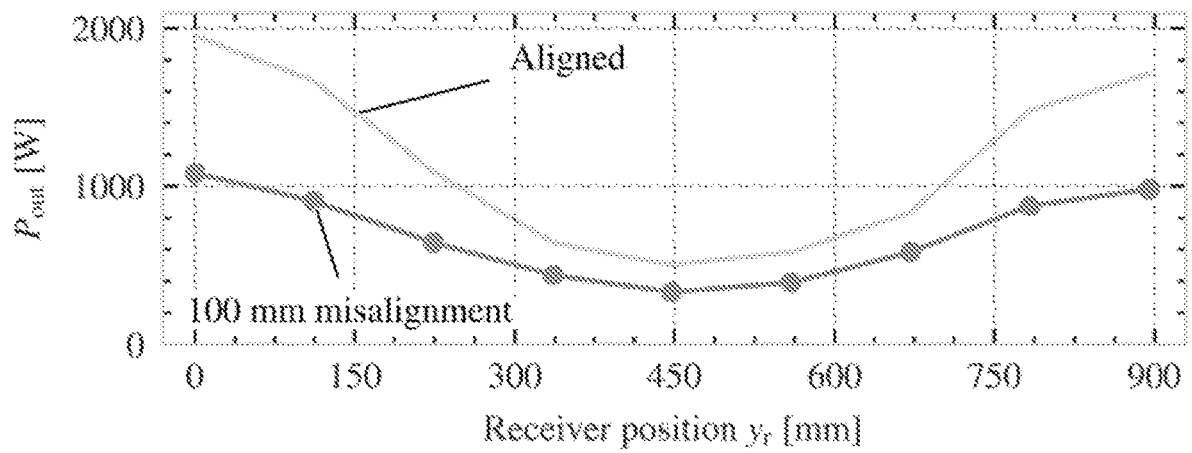
FIG. 16 illustrates experimental results for output power Pout as receiver position changes from the center of the first WPT transmission pad to the center of the second WPT transmission pad for different alignment conditions, according to various embodiments.

FIG. 16 illustrates experimental results for output power $P_{out}$ as receiver position changes from the center of the first WPT transmission pad to the center of the second WPT transmission pad for different alignment conditions, according to various embodiments. The output power versus the receiver position at 100 mm misalignment are shown in FIG. 16. At $y_r$=0 mm, the output power is 1082 W. Compared to the aligned case, the output power is decreased by 45%. To improve the tolerance to misalignment, larger ferrite plates are required for the transmitter and the receiver coils.

Figure 17:
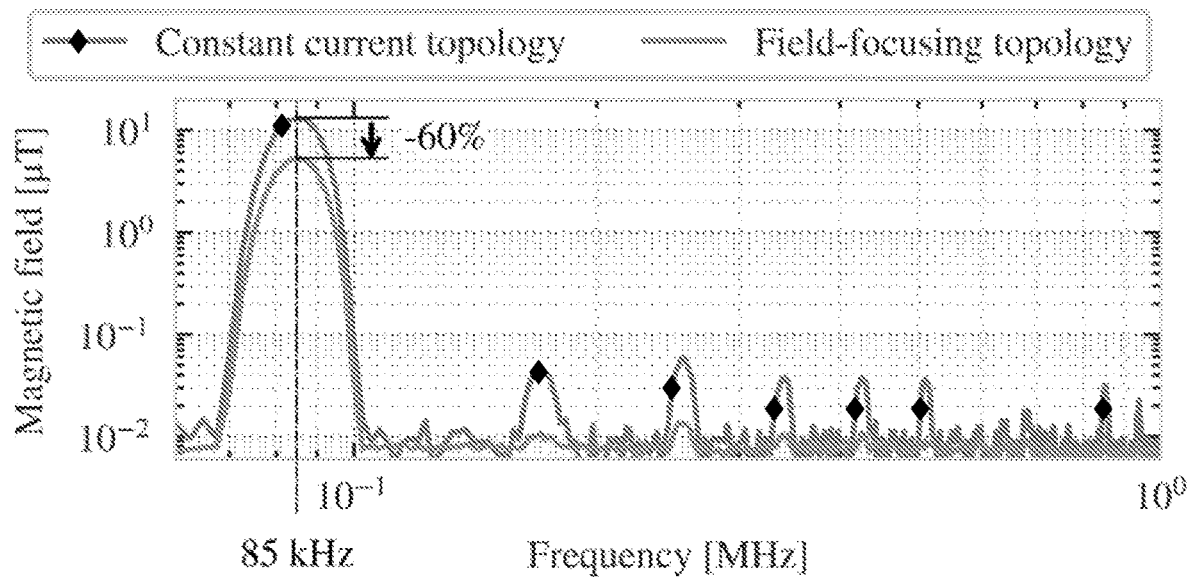
FIG. 17 is a diagram illustrating measured magnetic field at the uncoupled condition for the conventional constant current topology and the proposed reflexive field containment topology, according to various embodiments.

FIG. 17 is a diagram illustrating measured magnetic field at the uncoupled condition for the conventional constant current topology and the proposed reflexive field containment topology, according to various embodiments. The measured magnetic field of the proposed circuit and the constant current circuit topology are shown in FIG. 17. In the measurement, a double-sided LCC compensation circuit of FIG. 3B in an uncoupled condition was used. The amplitude of the transmitter current is 92 A with the constant current circuit topology since the transmitter current is constant in both the coupled and uncoupled conditions. The measured maximum stray field of the constant current circuit is 13.3 µT (0-peak) at 85 kHz. On the other hand, the amplitude of the transmitter current created by the proposed circuit is 37 A in the uncoupled condition since the proposed circuit creates maximum current (=92 A) in only the coupled condition.

The comparison of the measured and simulated results of the stray magnetic field in the uncoupled condition are shown in TABLE III. The experimental results and simulation results match well with a maximum error is 13.0%. From the results, the validity of the simulation results are shown.

TABLE III

Comparison of the measured and simulation results of the stray magnetic field in the uncoupled condition

| Description | Proposed circuit | Conventional constant current circuit |
| --- | --- | --- |
| Experiment | 5.4 µT (0-peak) | 13.3 µT (0-peak) |
| Simulation | 4.7 µT (0-peak) | 12.2 µT (0-peak) |
| Error | −13% | −8.3% |

Figure 18:
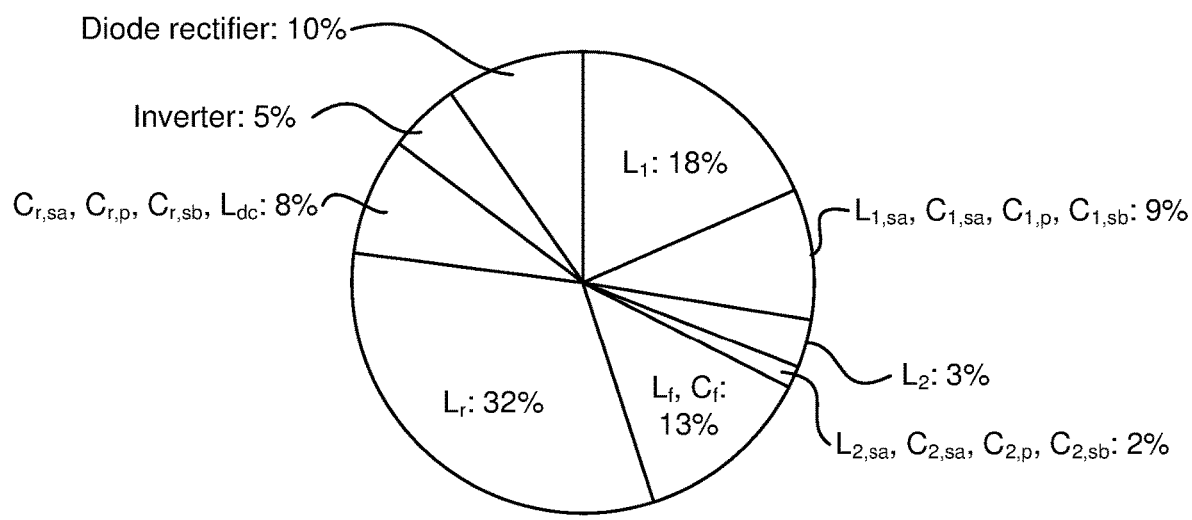
FIG. 18 is a pie chart illustrating simulated losses for components of the proposed circuit topology for 2,022 watts ("W"), a total loss of 678 W, and total efficiency of 74.9 percent, according to various embodiments.

Using the LTspice simulator described in above, the power loss in each component can be estimated, as shown in FIG. 18. The all parameters used in the simulation are the same as the values listed in TABLE I. The transmitter coil $L_1$ and the receiver coil $L_r$ consume the highest power of all the components because the coil pads are not optimized for the proposed circuit. The system efficiency can be improved by using wider diameter Litz wires for the low voltage and high current system. Also, if the input voltage and output voltage are changed from 50 V to 400 V, which is the most common input and output dc voltage in vehicle applications, the system efficiency will improve as the low current and high voltage system can decrease conduction losses. If the system is designed for 50 kW, 400 V system with the same current gain of 2.5, the expected dc-dc efficiency is around 88% to 90% according to our simulation results.

V. CONCLUSION

As described herein, a reflexive field containment dynamic wireless power transfer ("DWPT") system is proposed (e.g., FIGS. 3A-3C) that utilizes a reflected impedance to allow a single inverter to drive multiple transmitter coils. The validity of the proposed circuit has been demonstrated through circuit simulation and experimental results. The reflexive field containment approach can change the amplitude of the current in the transmitter coil automatically utilizing the reflected impedance. Hence, this approach can reduce the number of inverters and receiver-position sensors. The proposed circuit topology can achieve a higher output power and higher current gain of the transmitter coil compared to the conventional circuit. The proposed circuit and the conventional circuit have been designed, and the simulation result shows that the proposed circuit can increase the amplitude of the transmitter current by 53%, and the output power by 102% compared to the conventional circuit. A 2.0 kW prototype was constructed to validate the design of the proposed circuit. The experimental results show that the prototype matches well with the simulation results and that the circuit can amplify the transmitter current coil 2.5 times higher in the coupled condition than that of the uncoupled condition.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A wireless power transfer ("WPT") charging apparatus comprising:
    an inverter configured to connect with a direct current ("DC") source on an input side; and
    two or more WPT charging branches, each WPT charging branch comprising:
        a WPT charging pad circuit comprising a WPT charging pad connected in series with a first series charging capacitor;
        a parallel charging capacitor connected in parallel with the WPT charging pad circuit; and
        a series charging impedance connected in series between an output of the inverter and a connection between the WPT charging pad circuit and the parallel charging capacitor, the series charging impedance comprising a second series charging capacitor and/or a series charging inductor,
    wherein, for each of the two or more WPT charging branches, an inductance of the WPT charging pad and capacitance of the parallel charging capacitor are selected to operate at resonance at a switching frequency of the inverter in response to a WPT receiver pad being uncoupled with the WPT charging pad.

2. The WPT charging apparatus of claim 1, further comprising a WPT receiver apparatus comprising:
    a rectification section comprising an output configured to connect to a load; and
    a WPT receiver branch comprising:
        the WPT receiver pad connected in series with a first series receiver capacitor;
        a parallel receiver capacitor connected in parallel with a branch comprising the WPT receiver and first series receiver capacitor; and
        a second series receiver capacitor connected in series between a connection to the WPT receiver branch and an input of the rectification section.

3. The WPT charging apparatus of claim 2, wherein the series charging impedance, the first series charging capacitor, the parallel charging capacitor, the first series receiver capacitor, the parallel receiver capacitor, and the second series receiver capacitor are related by a buck-boost factor $n_1$ relating the series charging impedance with the parallel charging capacitor, and by:

$$n_2 = \frac{C_{r,p}}{C_{r,sb}} + 1 (n_2 > 1)$$

$$n_3 = \frac{C_{r,p}}{C_{r,sa}} + 1 (n_3 > 1)$$

wherein:
  $n_1$ is a buck-boost factor of an equivalent input voltage at the output of the inverter;
  $C_{r,p}$ is the parallel receiver capacitor;
  $C_{r,sb}$ is the first series receiver capacitor;

$C_{r,sa}$ is the second series receiver capacitor;

$n_2$ is a ratio relating the parallel receiver capacitor to the first series receiver capacitor; and $n_3$ is a ratio relating the parallel receiver capacitor to the second series receiver capacitor.

4. The WPT charging apparatus of claim 3, wherein the series charging impedance is the first series charging capacitor without the series charging inductor and wherein:

$$n_1 = \frac{C_{1,p}}{C_{1,sa}} + 1(n_1 > 0)$$

wherein:

$C_{1,p}$ is the parallel charging capacitor; and $C_{1,sa}$ is the second series charging capacitor.

5. The WPT charging apparatus of claim 3, wherein the series charging impedance comprises the first series charging capacitor and the series charging inductor and wherein:

$$n_1 = \frac{C_{1,p}}{C'_{1,sa}} + 1(n_1 > 0)$$

wherein:

$$C'_{1,sa} = \frac{C_{1,sa}}{1 + \omega^2 L_{1,sa} C_{1,sa}}$$

and wherein:

$C_{1,sa}$ is second series charging capacitor;

$\omega$ is an angular switching frequency of the inverter;

$C_{1,p}$ is the parallel receiver capacitor; and $L_{1,sa}$ is the series charging inductance.

6. The WPT charging apparatus of claim 3, wherein the series charging impedance is the series charging inductor without the first series charging capacitor, and wherein:

$$n_1 = -\omega^2 L_{1,sa} C_{1,p} + 1(n_1 > 0)$$

wherein:

$\omega$ is an angular switching frequency of the inverter;

$C_{1,p}$ is the parallel charging capacitor; and $L_{1,sa}$ is the series charging inductance.

7. The WPT charging apparatus of claim 3, wherein the buck-boost factor $n_1$ is less than 0.9 or greater than 1.1.

8. The WPT charging apparatus of claim 3, wherein $n_3$ is greater than 1.1.

9. The WPT charging apparatus of claim 2, wherein the one or more WPT charging branches comprise two or more WPT charging branches and the WPT receiver pad of the WPT receiver apparatus moves across the WPT charging pads of the WPT charging branches in a direction perpendicular to a plane comprising the WPT charging pads.

10. The WPT charging apparatus of claim 2, wherein the rectifier circuit comprises a low pass filter.

11. The WPT charging apparatus of claim 2, wherein the rectifier circuit comprises an active rectifier circuit comprising switches.

12. The WPT charging apparatus of claim 2, wherein the WPT charging pad and the WPT receiver pad are configured to transmit and receive power wirelessly.

13. The WPT charging apparatus of claim 1, wherein the inverter comprises a bandpass filter connected between an output of a switching section of the inverter and the output of the inverter, the bandpass filter comprising a bandpass inductor in series with a bandpass capacitor, wherein the bandpass filter is designed to pass a switching frequency of the inverter.

14. A system comprising:

a wireless power transfer ("WPT") charging apparatus comprising:

an inverter configured to connect with a direct current ("DC") source on an input side; and a plurality of WPT charging branches, each WPT charging branch comprising:

a WPT charging pad circuit comprising a WPT charging pad connected in series with a first series charging capacitor;

a parallel charging capacitor connected in parallel with the WPT charging pad circuit; and a series charging impedance connected in series between an output of the inverter and a connection between the WPT charging pad circuit and the parallel charging capacitor, the series charging impedance comprising a second series charging capacitor and/or a series charging inductor; and a WPT receiver apparatus comprising:

a rectification section comprising an output configured to connect to a load;

a WPT receiver branch comprising:

a WPT receiver pad connected in series with a first series receiver capacitor; and a parallel receiver capacitor connected in parallel with a branch comprising the WPT receiver and first series receiver capacitor; and a second series receiver capacitor connected in series between a connection to the WPT receiver branch and an input of the rectification section, wherein the WPT receiver pad is mobile with respect to each of the one or more the WPT charging pads, wherein the series charging impedance, the first series charging capacitor, the parallel charging capacitor, the first series receiver capacitor, the parallel receiver capacitor, and the second series receiver capacitor are related by a buck-boost factor $n_1$ relating the series charging impedance with the parallel charging capacitor, and by:

$$n_2 = \frac{C_{r,p}}{C_{r,sb}} + 1(n_2 > 1)$$

$$n_3 = \frac{C_{r,p}}{C_{r,sa}} + 1(n_3 > 1)$$

wherein:

$n_1$ is a buck-boost factor of an equivalent input voltage at the output of the inverter;

$C_{r,p}$ is the parallel receiver capacitor;

$C_{r,sb}$ is the first series receiver capacitor;

$C_{r,sa}$ is the second series receiver capacitor;

$n_2$ is a ratio relating the parallel receiver capacitor to the first series receiver capacitor; and $n_3$ is a ratio relating the parallel receiver capacitor to the second series receiver capacitor.

15. The system of claim 14, wherein one of:

the series charging impedance is the first series charging capacitor without the series charging inductor and wherein:

$$n_1 = \frac{C_{1,p}}{C_{1,sa}} + 1(n_1 > 0)$$

wherein:
- $C_{1,p}$ is the parallel charging capacitor; and
- $C_{1,sa}$ is the second series charging capacitor;

the series charging impedance comprises the first series charging capacitor and the series charging inductor and wherein:

$$n_1 = \frac{C_{1,p}}{C'_{1,sa}} + 1(n_1 > 0)$$

wherein:

$$C'_{1,sa} = \frac{C_{1,sa}}{1 + \omega^2 L_{1,sa} C_{1,sa}}$$

and wherein:
- $C_{1,sa}$ is second series charging capacitor;
- ω is an angular switching frequency of the inverter;
- $C_{1,p}$ is the parallel receiver capacitor; and
- $L_{1,sa}$ is the series charging inductance; or the series charging impedance is the series charging inductor without the first series charging capacitor and wherein:

$$n_1 = -\omega^2 L_{1,sa} C_{1,p} + 1(n_1 > 0)$$

wherein:
- ω is an angular switching frequency of the inverter;
- $C_{1,p}$ is the parallel charging capacitor; and
- $L_{1,sa}$ is the series charging inductance.

16. The system of claim 14, wherein the buck-boost factor $n_1$ is less than 0.9 or greater than 1.1, and/or wherein the $n_3$ is greater than 1.1.

17. The system of claim 14, wherein the inverter comprises a bandpass filter connected between an output of a switching section of the inverter and the output of the inverter, the bandpass filter comprising a bandpass inductor in series with a bandpass capacitor, wherein the bandpass filter is designed to pass a switching frequency of the inverter.

18. A system comprising:
- a wireless power transfer ("WPT") charging apparatus comprising:
  - an inverter configured to connect with a direct current ("DC") source on an input side; and
  - a plurality of WPT charging branches, each WPT charging branch comprising:
    - a WPT charging pad circuit comprising a WPT charging pad connected in series with a first series charging capacitor;
    - a parallel charging capacitor connected in parallel with the WPT charging pad circuit; and
    - a series charging impedance connected in series between an output of the inverter and a connection between the WPT charging pad circuit and the parallel charging capacitor, the series charging impedance comprising a second series charging capacitor and a series charging inductor; and
- a WPT receiver apparatus comprising:
  - a rectification section comprising an output configured to connect to a load;
  - a WPT receiver branch comprising:
    - a WPT receiver pad connected in series with a first series receiver capacitor;
    - a parallel receiver capacitor connected in parallel with a branch comprising the WPT receiver and first series receiver capacitor; and
    - a second series receiver capacitor connected in series between a connection to the WPT receiver branch and an input of the rectification section, wherein the WPT receiver pad is mobile with respect to each of the one or more the WPT charging pads, and wherein:

$$n_1 = \frac{C_{1,p}}{C_{1,sa}} + 1(n_1 > 0)$$

$$C'_{1,sa} = \frac{C_{1,sa}}{1 + \omega^2 L_{1,sa} C_{1,sa}}$$

$$n_2 = \frac{C_{r,p}}{C_{r,sb}} + 1(n_2 > 1),$$

$$n_3 = \frac{C_{r,p}}{C_{r,sa}} + 1(n_3 > 1)$$

wherein:
- $C_{1,sa}$ is second series charging capacitor;
- ω is an angular switching frequency of the inverter;
- $C_{1,p}$ is the parallel receiver capacitor;
- $L_{1,sa}$ is the series charging inductance;
- $C_{r,p}$ is the parallel receiver capacitor;
- $C_{r,sb}$ is the first series receiver capacitor;
- $C_{r,sa}$ is the second series receiver capacitor;
- $n_1$ is a buck-boost factor of an equivalent input voltage at the output of the inverter;
- $n_2$ is a ratio relating the parallel receiver capacitor to the first series receiver capacitor; and
- $n_3$ is a ratio relating the parallel receiver capacitor to the second series receiver capacitor.

* * * * *